United States Patent [19]
Hampton

[11] Patent Number: 6,102,617
[45] Date of Patent: Aug. 15, 2000

[54] IMPOUNDMENT LEAK DETECTION, LOCATION, AND CONTAINMENT SYSTEM AND METHOD WITH MOBILE SENSOR

[75] Inventor: Burt T. Hampton, Homer, La.

[73] Assignee: Vivian A. Hampton, Magnolia, Ak.

[21] Appl. No.: 09/006,602

[22] Filed: Jan. 13, 1998

[51] Int. Cl.[7] .............................. B09B 1/00; E02D 3/00
[52] U.S. Cl. ........................ 405/52; 405/128; 405/270; 588/259
[58] Field of Search .................... 405/128, 129, 405/263, 264, 270, 43, 45, 52

[56] References Cited

U.S. PATENT DOCUMENTS

| | | |
|---|---|---|
| 3,383,863 | 5/1968 | Berry . |
| 4,430,021 | 2/1984 | Wagner et al. ............... 405/129 |
| 4,615,809 | 10/1986 | King ............................. 405/264 X |
| 4,624,604 | 11/1986 | Wagner et al. ............... 405/129 X |
| 4,682,492 | 7/1987 | Green ........................... 73/49.2 |
| 4,696,599 | 9/1987 | Rakoczynski et al. ........ 405/129 |
| 4,725,785 | 2/1988 | Converse et al. ............. 324/559 |
| 4,740,777 | 4/1988 | Slocum et al. ................ 340/522 |
| 4,753,551 | 6/1988 | Brueggemann et al. ..... 405/129 X |
| 4,810,131 | 3/1989 | Turner ........................... 405/129 |
| 4,810,573 | 3/1989 | Harriett ......................... 405/263 X |
| 4,844,840 | 7/1989 | Feizollahi ..................... 252/633 |
| 4,846,604 | 7/1989 | Holtmann ...................... 405/129 X |
| 4,867,604 | 9/1989 | Bell ............................... 405/128 |
| 4,922,232 | 5/1990 | Bosich ........................... 340/605 |
| 4,947,470 | 8/1990 | Darilek ........................... 324/557 |
| 4,955,983 | 9/1990 | Meess et al. ................... 405/128 |
| 5,030,033 | 7/1991 | Heintzelman et al. . |
| 5,100,258 | 3/1992 | Van Wagoner ............... 405/43 X |
| 5,141,362 | 8/1992 | Kugler ........................... 405/264 X |
| 5,318,382 | 6/1994 | Cahill ............................ 405/128 |
| 5,357,202 | 10/1994 | Henderson .................... 324/557 |
| 5,446,445 | 8/1995 | Bloomfield el al. .......... 340/521 |
| 5,447,055 | 9/1995 | Thompson et al. ........... 73/49.2 |
| 5,460,032 | 10/1995 | Hampton et al. ............. 73/49.2 |
| 5,462,390 | 10/1995 | Sydansk ......................... 405/264 |
| 5,500,245 | 3/1996 | Toushin .......................... 405/264 X |
| 5,502,267 | 3/1996 | Aubert ........................... 588/250 |
| 5,583,283 | 12/1996 | Hampton et al. .............. 73/40.5 R |
| 5,588,785 | 12/1996 | Holland ......................... 405/270 |
| 5,625,150 | 4/1997 | Greene et al. ................. 73/649 |

OTHER PUBLICATIONS

"Emelle Facts, Landfill Construction," Advertisement, Chemical Waste Management, Inc., Date Unknown, but prior to 1991.

"Emelle Facts, Environmental Monitoring," Advertisement, Chemical Waste Management, Inc., Date Unknown, but prior to 1991.

"Emelle Facts, Environmental Compliance," Advertisement, Chemical Waste Management, Inc., Date Unknown, but prior to 1991.

"Emelle Facts, Sitting and Geology," Advertisement, Chemical Waste Management, Inc., Date Unknown.

"Emelle Facts, Natural and Man–Made Protection," Advertisement, Chemical Waste Management, Inc., Date Unknown.

"Our Prefabricated Petrochemical Secondary Containment System Prevents Contamination From Hydrocarbon Spills," Advertisement, Gundle Lining Systems, Inc., Date Unknown.

Goldberg, D. "Incinerator Ash: New Problems for Landfills," *Recycling Today* (May 1988), pp. 41–42, 44, 67.

(List continued on next page.)

Primary Examiner—Dennis L. Taylor
Attorney, Agent, or Firm—Carr & Storm, L. L. P.

[57] ABSTRACT

An impoundment leak detection, location, and containment system includes a leak detection and location structure positioned below the impoundment with a system of conduit spanning substantially all of the extent under the impoundment. A mobile sensor system can be maneuvered through the conduit and into the leak detection and location structure to identify and locate leaks in the impoundment above. The system also includes a hydrocarbon sealing compound which has a sealing effect when exposed to fluids containing water and/or hydrocarbon liquids.

23 Claims, 19 Drawing Sheets

OTHER PUBLICATIONS

"An Added Barrier of Protection From Gundle: High Performance HDPE/Bentonite Composite Landfill Liner," Advertisement, Gundle Lining Systems, Inc., 1990.

"Sanitary Landfills," Advertisement, Gundle Lining Systems, Inc., 1990.

"The Problem of Leaking Tanks," Advertisement, Gundle Lining Systems, Inc., 1991.

"Hyperlastic' VLDPE Lining System," Advertisement, Gundle Lining Systems, Inc., 1991.

Geofabrics Australia PTY.LTD., "Alternatives to Compacted Clay Liners," (visited Dec. 30, 1997) <http://www.geofabrics.com.au/bntx002.htm>.

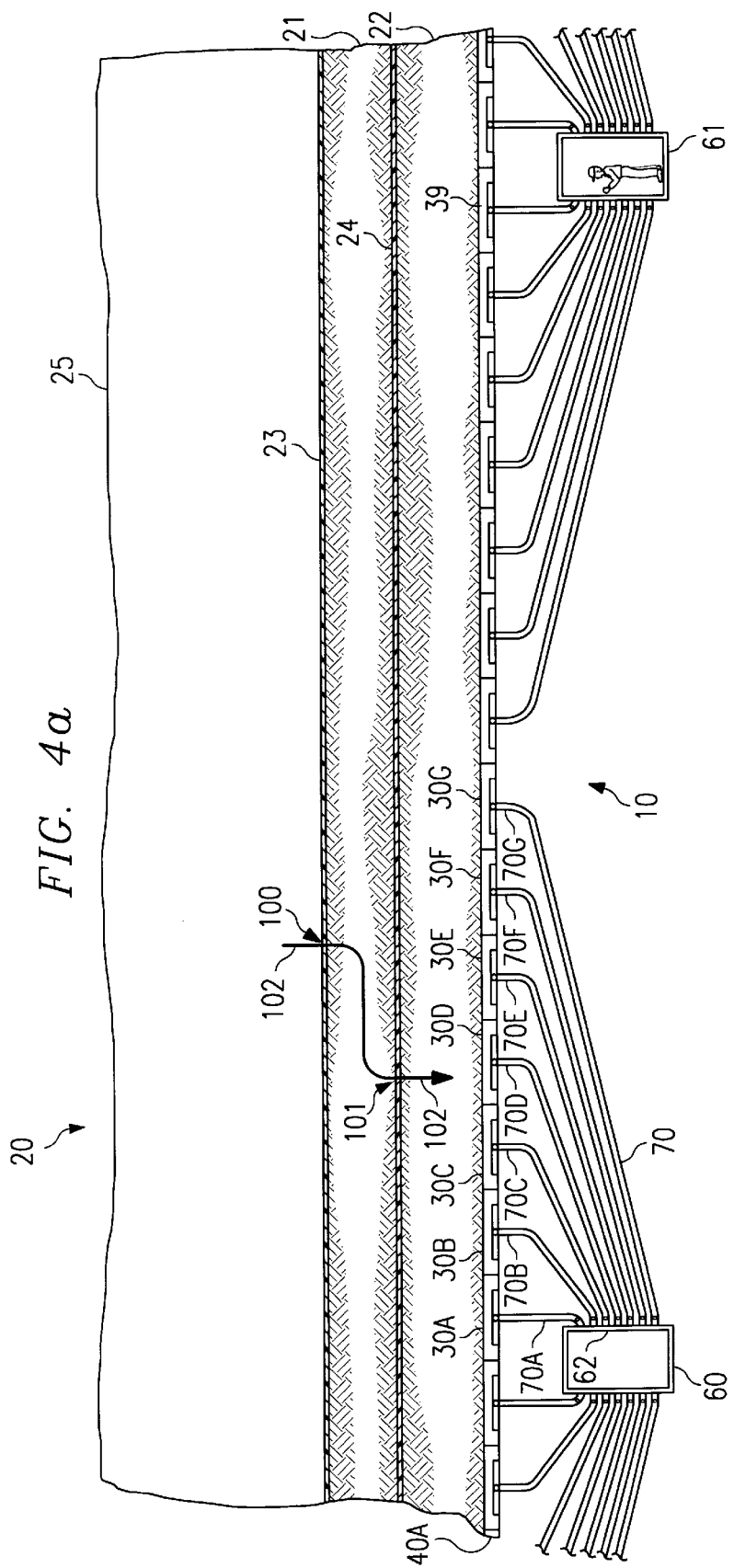

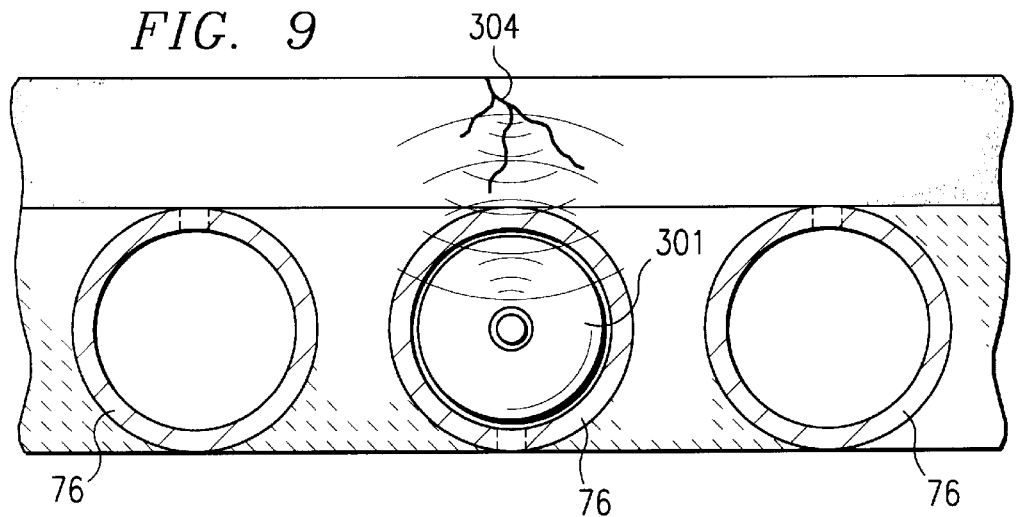
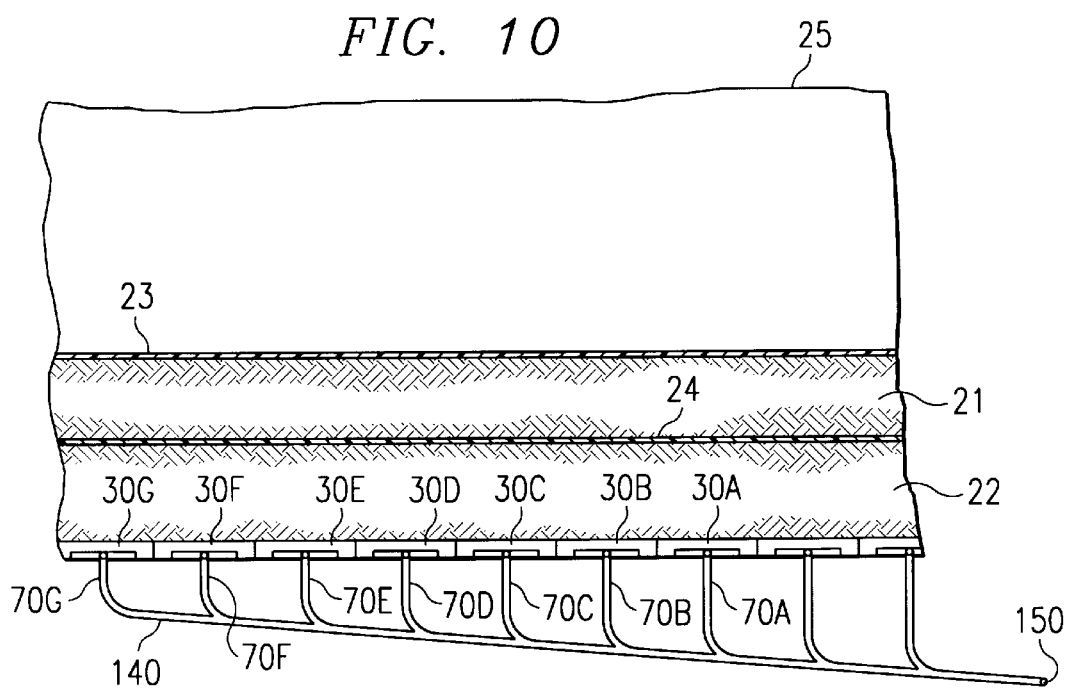

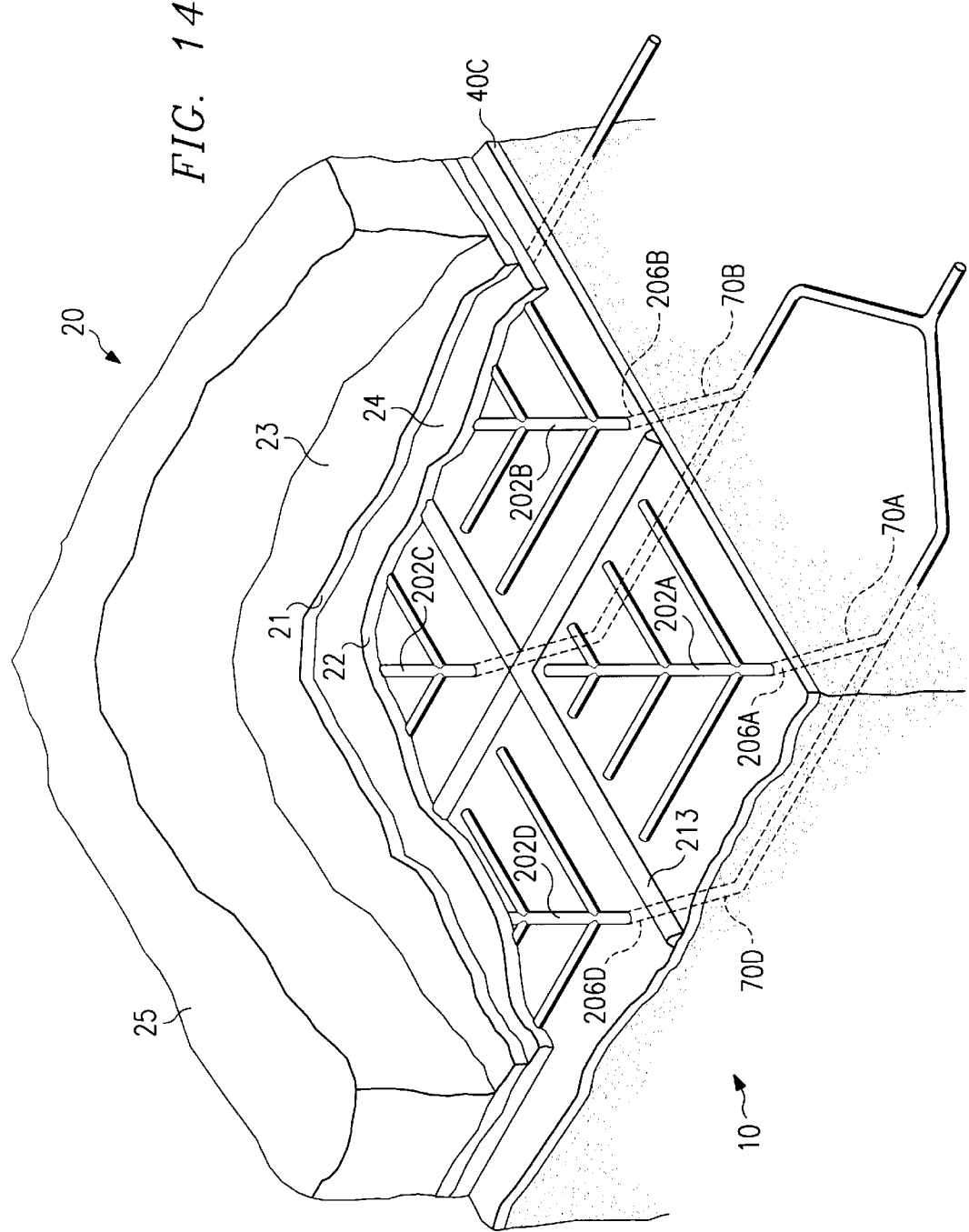

IMPOUNDMENT LEAK DETECTION, LOCATION, AND CONTAINMENT SYSTEM AND METHOD WITH MOBILE SENSOR

BACKGROUND OF THE INVENTION

1. Field of the Invention

This invention relates to the containment of environmentally hazardous materials, and in particular, to a system for detecting, locating, and containing a leak from an impoundment. The system consists of a mobile sensor system that is used in combination with a system of leak detection modules installed beneath an impoundment. The combination permits detecting, locating and containing leaks from an impoundment, as well as permitting leak repair. The invention is directed to both an apparatus for detecting and repairing leaks as well as to a method of doing the same.

2. Description of the Prior Art

Storage and disposal of hazardous waste is a matter of significant public concern given the health and safety risks which can result from a leak. Presently, such storage is often accomplished in various types of impoundments which may include landfills, surface tanks, underground tanks as well as other structures designed to contain the hazardous materials and to prevent leakage or migration of the hazardous materials out into the environment.

To alleviate the risk of environmental contamination, government regulations require the installation (in many situations) of one or more synthetic liners, known as secondary containment systems, below landfills and many other impoundments of hazardous or potentially hazardous materials. The liners typically are large sheets of flexible, polymeric material, such as high density polyethylene, and are intended to resist degradation caused by the environment and contact with caustic hazardous waste. During construction of the impoundment, individual sheets of the liner material are seamed together at the construction site to form a continuous liner which extends below and completely encompasses the bottom of the impoundment. Where more than one liner is used, a layer of clay or some other material having a low permeability is often placed between the liners.

Although the liners are intended to be impermeable, in fact many will eventually develop leaks. Recognizing the difficulty of having a liner or liner system that is completely free of leaks, some leakage is expected and permitted. In fact, government regulations permit some defined leakage per acre per day through a liner. Government regulations also require that the liners or secondary containment system be augmented by a number of monitoring wells at locations surrounding and adjacent to the impoundment. The purpose of the monitoring wells is to allow for the periodic testing of groundwater below the impoundment. The detection of hazardous material in the groundwater indicates a failure of the secondary containment system.

There are, however, some serious shortcomings associated with the use of synthetic liners and monitoring wells for the safe storage and disposal of hazardous waste. First, as noted above, synthetic liners unfortunately have a tendency to develop leaks over time. The leaks can be caused by a number of factors such as punctures, split seams, and differential settling of the underlying soil. Once a leak occurs, there is nothing to prevent the hazardous material from escaping the impoundment and contaminating nearby soil, surface water, and groundwater. Second, when a leak is first discovered through the detection of hazardous material in a groundwater sample taken from a monitoring well, significant damage to the environment will have already been inflicted. The hazardous waste will have already contaminated groundwater, an important source of public drinking water. Finally, the detection of hazardous waste in samples taken from the monitoring wells only reveals the existence of a leak, it provides no useful information as to the location and severity of the leak. Consequently, to correct the problem, it is necessary to remove the entire impoundment and completely replace all synthetic liners at an enormous financial cost. Such remedial measures also pose an increased danger to public health and safety because of the additional contact with the relocated hazardous waste.

The present inventor has previously proposed solutions for some of these problems as shown in Hampton et al., U.S. Pat. Nos. 5,460,032 and 5,583,283; The Hampton et al. patents describe an apparatus for the detection, location, and containment of leaks from impoundments which contain potentially hazardous waste. The apparatus consists of a modular structure designed to be installed below the impoundment, thereby forming a collection grid. The structure is installed either below the synthetic liner as an impoundment's secondary containment system or below the lowest layer of an impoundment which does not employ a liner. The apparatus comprises a plurality of leak detection modules for collecting and localizing fluid escaping from a leak in the above impoundment, and each of the modules is provided with a conduit connected to a tunnel extending beneath the structure. Such apparatus provides that leaking fluid will be directed from the module nearest the leak via the connected conduit to an underlying access location. By providing sensors in the underlying access location, leaking fluid may be detected and the severity of the leak ascertained. Additionally, because each conduit is connected to a specific leak detection module, the position of the leak can be localized to the vicinity of that module. Furthermore, because fluid which leaks through the liner is collected by the conduit system, any fluid which has leaked may be pumped out, collected or otherwise safely disposed.

Although the above-described inventions offer substantial capabilities over the previously available technologies for detection and localization of leaks, as well as for collection of any potentially hazardous fluid which may escape due to a leak, economic considerations demand that any impoundment system be as affordable as possible. Additionally, considerations in ease of fabrication, installation, and maintenance mandate that the system lend itself to conventional construction methods and tools. Finally, different waste compounds pose varying degrees of environmental risk, mandating that varying degrees of security be available in the impoundment system, each with a cost corresponding to the degree of security required.

Thus, there remains a need for an impoundment leak detection and containment system which is highly effective yet affordable, easy to fabricate and install using conventional tools and construction techniques, and which offers varying levels of protection which may be tailored to the various types of materials to be impounded.

SUMMARY OF THE INVENTION

The present invention is an apparatus and method for the detection, location, and containment of leaks from impoundments comprising a plurality of leak detection zones or modules which are formed or installed beneath the impoundment and a conduit system which connects each leak detection zone or module to an access location. The system is further comprised by a mobile sensor system which can be maneuvered through the conduit to pinpoint the location of present or impending leaks, and to provide information for use in repairs. The leak detection zones or modules may be formed alternatively by constructing a substantially impermeable grid of leak detection modules, as are described in the above-mentioned Hampton et al. patents, or by forming leak detection zones by filling the area near the conduit with a filtering substance of relatively permeable material, and separating each zone by a boundary of low permeability material. In the latter structure, the use of a mobile sensor permits the conduit running from each of the leak localization zones to be branched together to lead to a single detection/collection point without sacrificing the ability to identify which area is leaking. By directing the mobile sensor into any branch of the conduit system, a leak in a zone or module can be detected by the presence of fluid in that branch of the conduit. Also, the use of a compact sensor permits the tunnel or a common conduit from which all other conduits branch, to be no larger than is necessary to accommodate the sensor. As a result, the construction of the leak detection and containment system can be simplified and the cost reduced. Additionally, use of a small conduit allows the leak detection and containment systems to be more readily adapted to local conditions at the impoundment site.

Another aspect of the invention is a method of using a mobile sensor in conjunction with a leak detection system for identifying the location of a leak in an impoundment.

A further aspect of the invention is that the degree of environmental protection may be tailored to the level of risk posed by the impounded material by providing one, two, or more layers of stacked leak detection and containment systems, with each layer optionally separated by a substantially impermeable liner. By scaling the protection to the degree of risk, an optimum economic solution may be obtained.

An additional aspect of the present invention, for impoundments intended to contain, for instance, hydrocarbon compounds among other substances, is a sealing compound which may be added to the containment system, where the sealing compound includes at least one material having an affinity or chemical reactiveness for hydrocarbons and/or a sealing response to hydrocarbons. Such a sealing compound may supplement or replace a liner layer by absorbing and/or sealing against a leaching hydrocarbon leak. The absorptive filler is not limited to responding to and selectively absorbing hydrocarbon compounds, a selected filler material may have an affinity to or reactiveness for any desired type of compound(s) to be impounded. This aspect of the invention relates to both the sealing compound which may be used in an impoundment as well as to the method of constructing an impoundment using the sealing compound.

Another aspect of the invention is a method of installing a leak detection system in a location to be used as an impoundment where the system consists of a plurality of connected leak detection modules, each of which has a known location with respect to the impoundment, and a plurality of fluid conduits each of which are connected at one end to a respective one of the modules, and where each of the conduits has a known association with a respective module.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers.

FIG. 4(a) is a cross-sectional view of the first embodiment of the present invention along the line 4—4 of FIG. 3.

FIG. 9 is a cross-sectional front view of a mobile sensor system having an ultrasonic transceiver which is inside a conduit.

FIG. 10 is a cross-sectional view of a second embodiment of the present invention illustrating the conduits branching together beneath the impoundment.

FIG. 14 is a plan view of a third embodiment of the present invention in place below an impoundment with portions of the impoundment removed illustrating several herringbone patterns of conduit as may be required for a large impoundment.

DETAILED DESCRIPTION OF THE PREFERRED EMBODIMENTS

Figure 1:
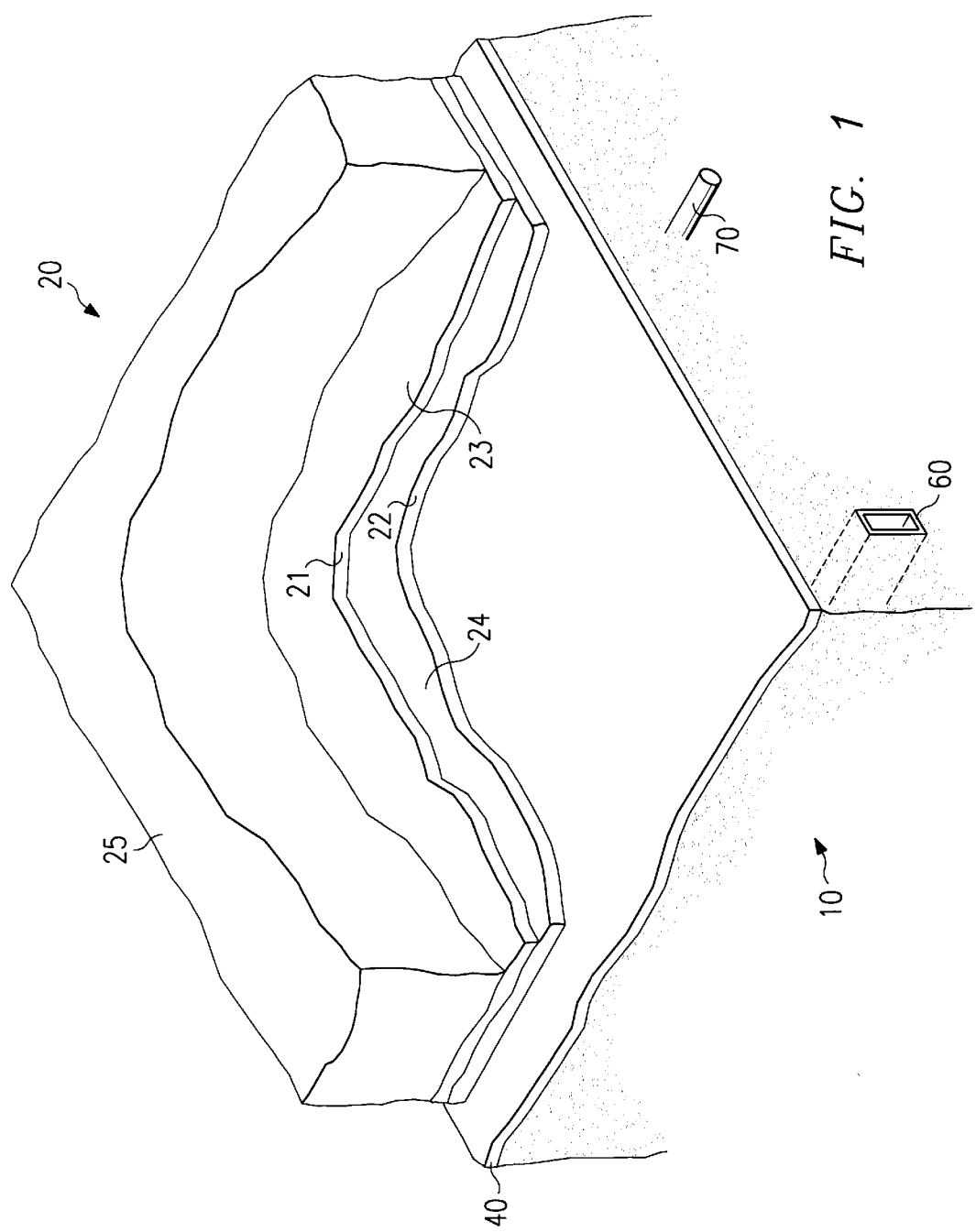
FIG. 1 is a perspective view of the present invention in place below an impoundment with portions of the impoundment removed.

The impoundment leak detection, location, and containment system of the present invention is depicted generally in FIG. 1. The system is installed below an impoundment which contains hazardous materials and which must not be allowed to leach out into the surrounding environment. For the purposes of this detailed description the system is shown installed below a landfill. It will be understood by those skilled in the art that the system is not limited to use only in conjunction with landfills, but may also be used with many other types of impoundments including tanks, tank farms, underground tanks and various kinds of vault structures. In fact, the present invention may be used in conjunction with any type of impoundment or structure which holds material that could harm the environment or public if leakage were to occur where the location of the leak needs to be identified more specifically than the impoundment generally.

Referring to FIG. 1, landfill 20 comprises a first clay layer 21 and a second clay layer 22, which are each approximately one to three feet thick, depending upon the design of the particular landfill. First liner 23 lies directly above first clay layer 21. Second liner 24 lies sandwiched between first clay layer 21 and second clay layer 22. Waste 25 rests above first liner 23.

Referring to FIG. 1 to describe the landfill and the leak detection modules, a portion of landfill 20 has been removed to more clearly illustrate the present invention. System 10 comprises a leak detection structure 40 which extends below landfill 20. Leak detection structure 40 is positioned such that fluid escaping from a leak in first liner 23 and second liner 24 will seep downward due to gravitational forces and be detected in and localized by leak detection structure 40. One or more access passages 60, or access conduits 70 extend beneath the leak detection structure 40 and are connected thereto (Connection not shown).

As will be described in the several embodiments below, leak detection structure 40 contains provisions to collect seeping fluid and to localize collection of fluid in order to facilitate determination of the position of a leak. In the first embodiment of the present invention, a mobile sensor, which will be described in more detail below, is used in conjunction with the leak detection structure to provide information about present or impending leaks, including, but not limited to, the location and severity of a leak as well as chemical information about the composition of a leak.

Figure 2:
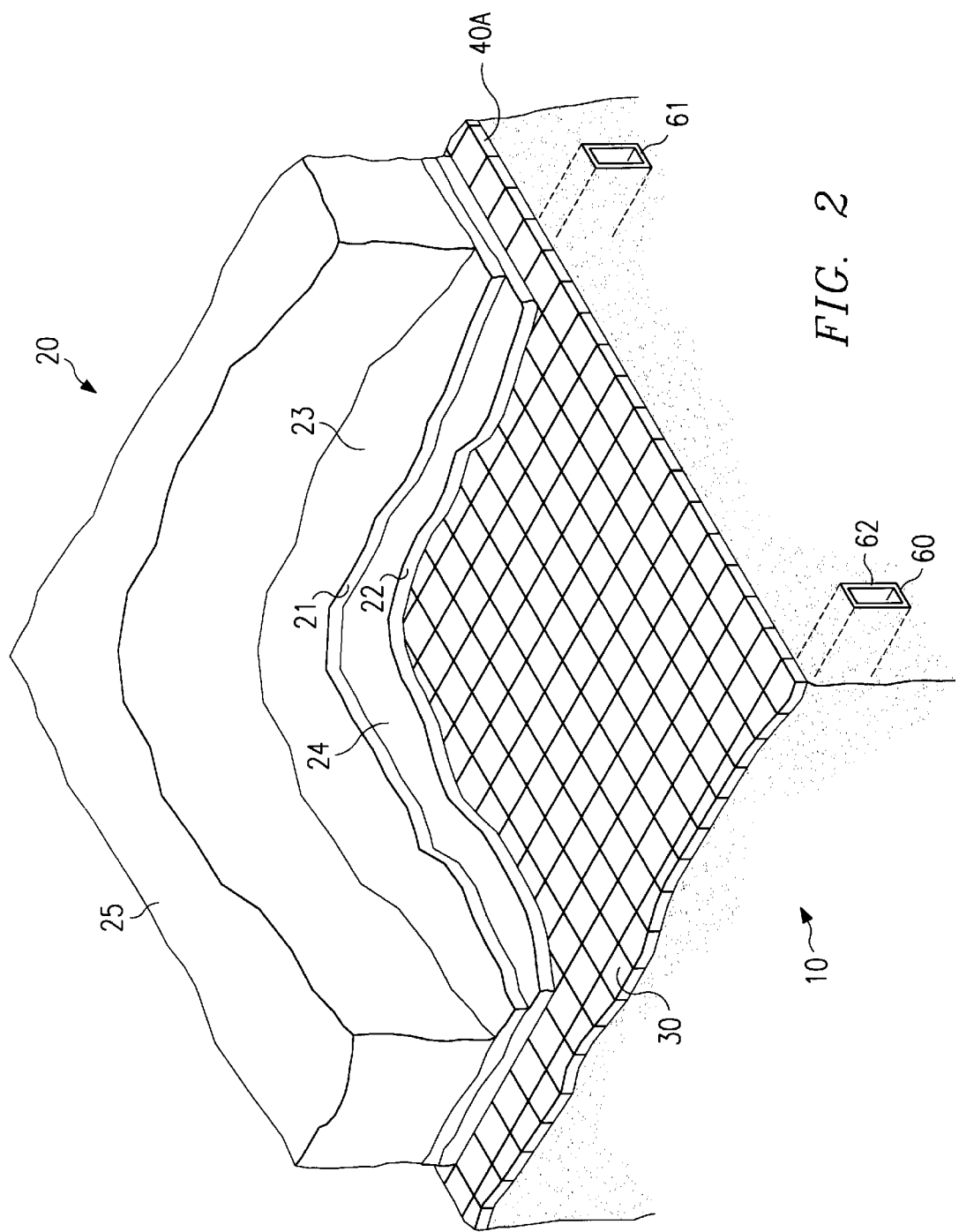
FIG. 2 is a perspective view of a first embodiment of the present invention in place below an impoundment with portions of the impoundment removed.

First Embodiment of the Leak Detection Structure:

The leak detection structure will be described first, followed later by a description of the mobile sensor. FIG. 2 illustrates a first embodiment of leak detection structure 40, which is comprised of a substantially impermeable grid 40A of leak detection modules 30 of the type disclosed in the above-mentioned Hampton et al. patents.

Figure 3:
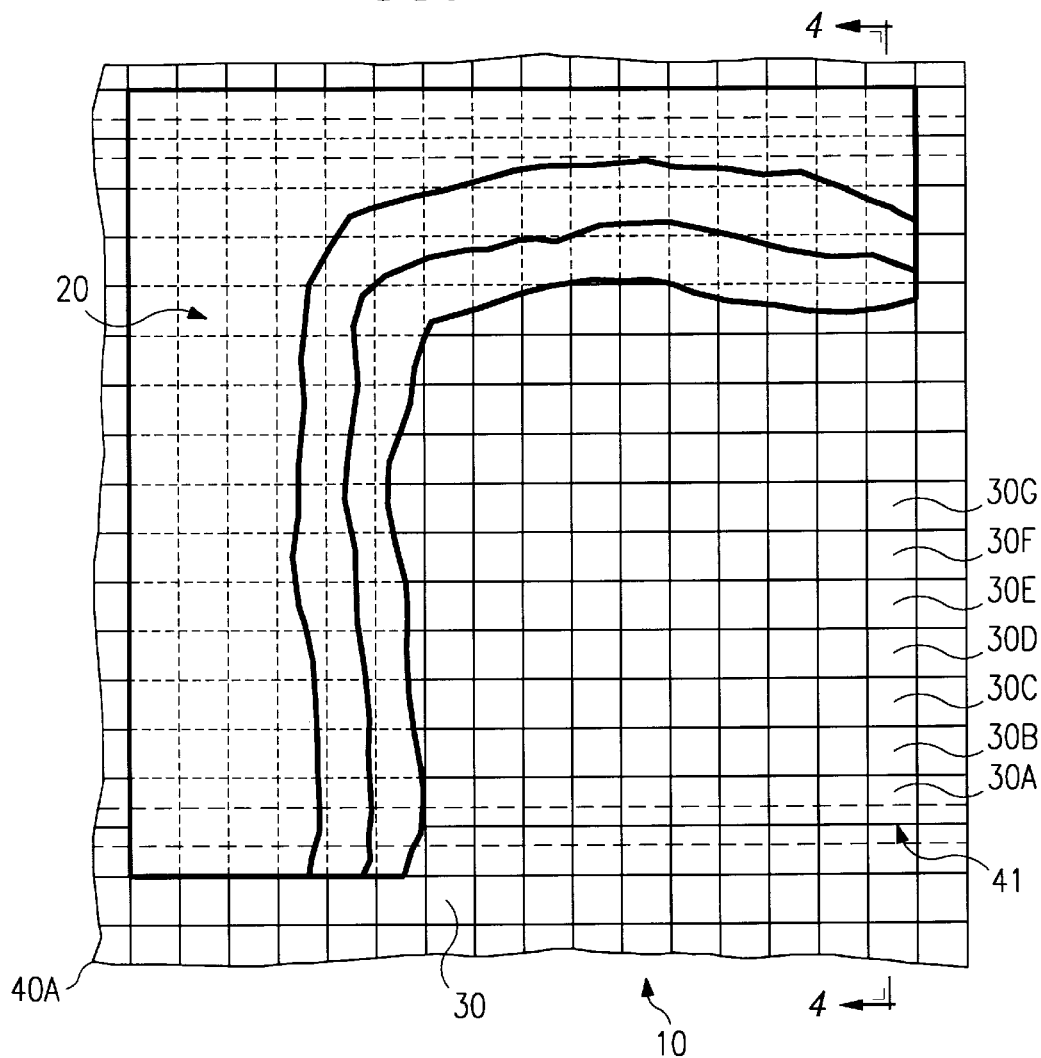
FIG. 3 is a plan view of a first embodiment of the present invention in place below an impoundment with portions of the impoundment removed.

As shown in FIG. 3, grid 40A comprises a plurality of rows of leak detection modules 30. A typical row 41 comprises individual leak detection modules 30A–30G. Although, for purposes of this description, typical row 41 comprises seven leak detection modules 30, it will be understood by those skilled in the art that in actual practice row 41 is likely to comprise significantly more than that number. In fact, the exact number used in each case may be varied to accommodate the size of the landfill 20. A larger landfill 20 may require more individual leak detection modules 30 in each typical row 41. A smaller landfill 20, on the other hand, may require fewer leak detection modules 30 in each typical row 41. The number of leak detection modules 30 may also vary because the dimensions of each individual impoundment may be larger or smaller based on the impoundment designer's choice. Adjacent rows of leak detection modules 30 are connected to form grid 40A which constitutes a substantially impermeable layer beneath the impoundment.

Figure 4B:
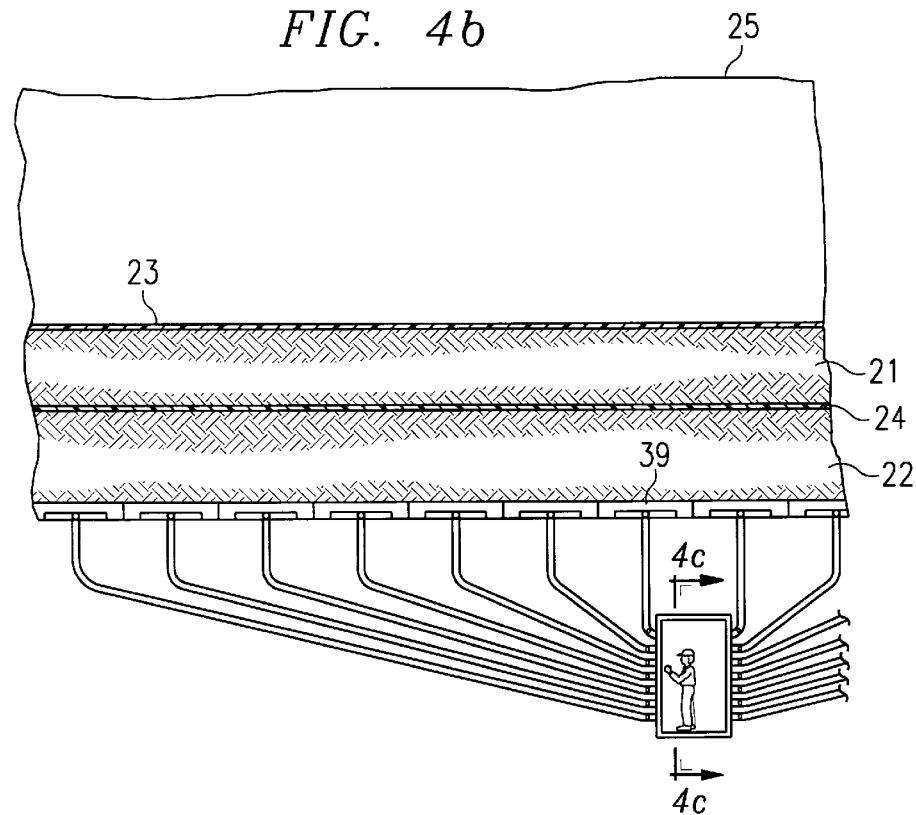
FIG. 4(b) is a partial cross-sectional view of the first embodiment of the present invention along the line 4—4 of FIG. 3 showing detail of the inside of the tunnel wall.
Figure 4C:
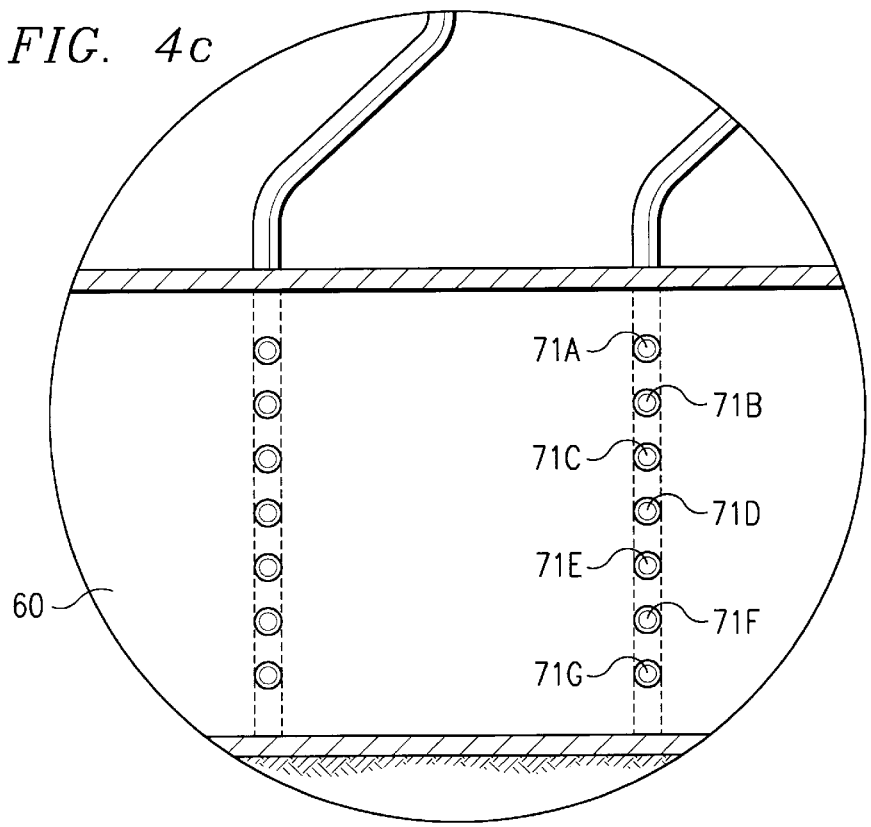
FIG. 4(c) is a partial cross-sectional view of the access passage 60, and illustrates how the ends of the conduits 71A–71G connect with the sidewall of the access passage 60.

Referring now to FIG. 4(a), it may be seen that the impoundment leak detection, location, and containment system of the first embodiment further comprises a plurality of conduits 70A–70G, one conduit running from each leak detection module 30A–30G down to an access location. Each conduit provides a downward passage for fluid that has leaked into a leak detection module to be communicated to an access location for detection and collection. In FIG. 4(a), an access passage is shown as an access location where each conduit 70A–70G connects with the sidewall of the access passage 60 to provide access to the conduit ends 71A–71G. FIG. 4(b) illustrates how the ends of the conduits 71A–71G terminate in the access passage 60 at a point lower than the leak detection modules so that any collected fluid will flow downwards by gravity. FIG. 4(c) illustrates how the ends of the conduits 71A–71G connect with the sidewall of the access passage 60, thereby providing access for leak detection and fluid collection.

Figure 4D:
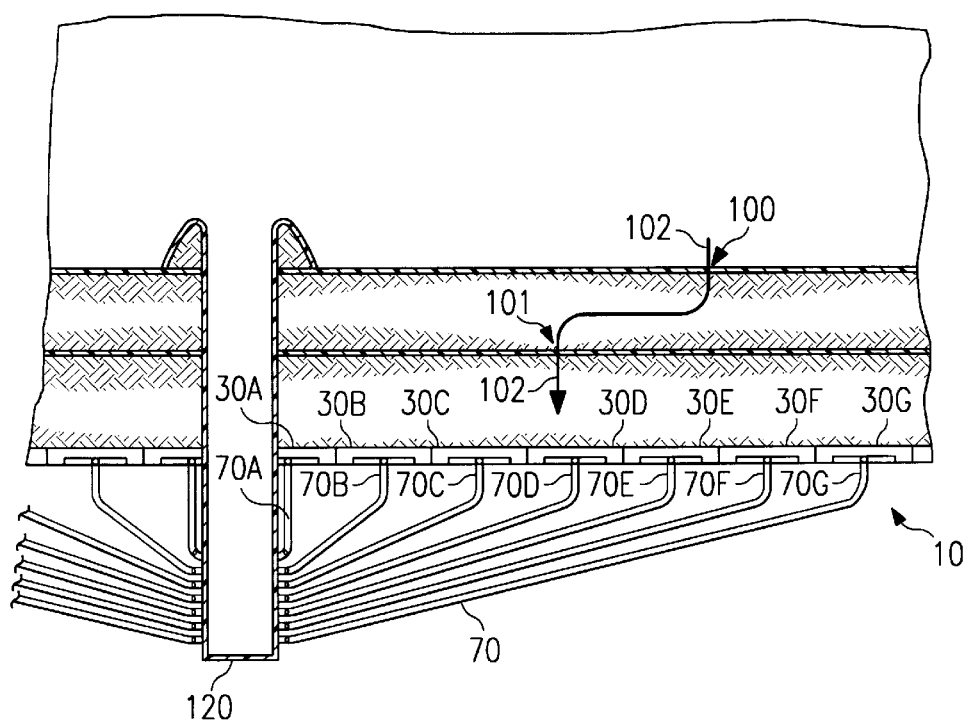
FIG. 4(d) is a cross-sectional view of the first embodiment of the present invention along the line 4—4 of FIG. 3, but where the access passage is a vertical shaft.
Figure 4E:
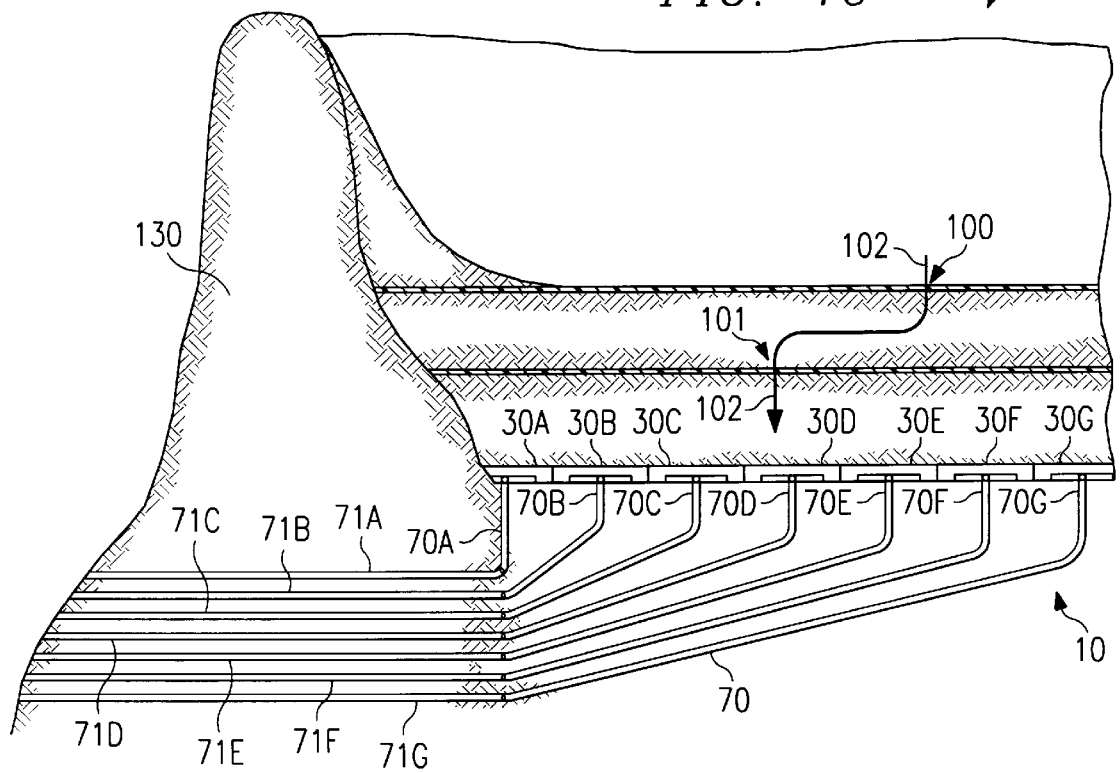
FIG. 4(e) is a cross-sectional view of the first embodiment of the present invention along the line 4—4 of FIG. 3, but where the impoundment is adjacent to an embankment and the access point is on the embankment.

Although a tunnel is illustrated in FIGS. 4(a)–4(b) as providing an access passage to the conduits, it will be appreciated that any passage which provides access to the conduit ends may be substituted. To illustrate, in FIG. 4(d) a vertical tunnel or shaft 120 is shown as an access location where each conduit 70A–70G connects with the vertical sidewall of the shaft 120 to provide access to the ends of the conduits 71A–71G. Similarly, in FIG. 4(e) an open trench or embankment 130 adjacent to the impoundment is shown providing access to the ends of the conduits through the open trench or embankment. Again, the ends of the conduits 71A–71G extend through the side of the open trench or embankment 130 and are thus accessible, thereby providing access for leak detection, fluid collection, and optionally, leak repair. It should be noted that although three arrangements are shown for providing an access to the ends of the conduits, it will be appreciated that still other means for providing access to the ends of the conduits will be apparent to those skilled in the art and are considered within the scope of the present invention.

Figure 5A:
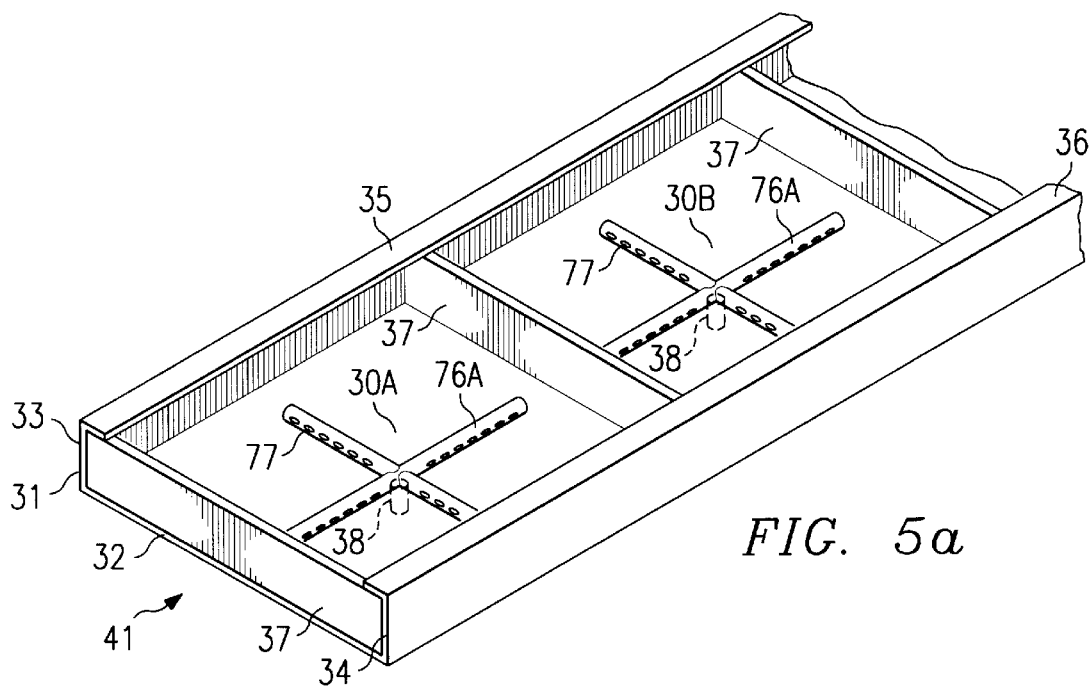
FIG. 5(a) is a perspective view showing two leak detection modules of the present invention.
Figure 5B:
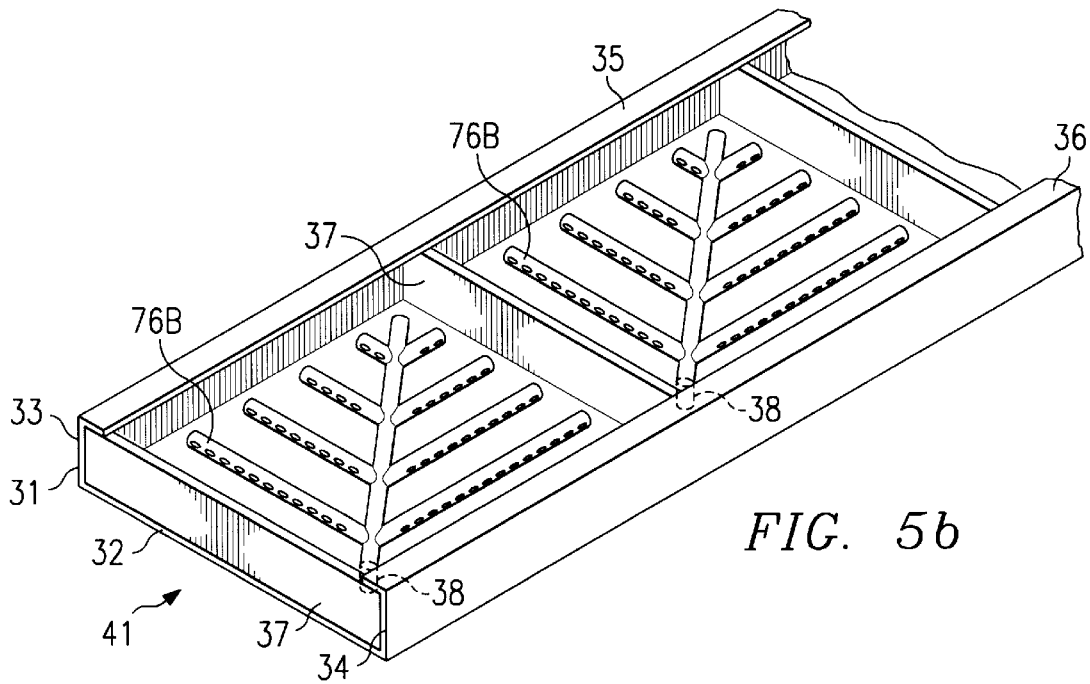
FIG. 5(b) is a perspective view showing two leak detection modules of the present invention, but where the drain conduit is arranged in a herringbone pattern.

A more detailed view of a portion of a typical row 41 of leak detection modules 30 is shown in FIGS. 5(a) and 5(b). Typical row 41 may be fabricated from a single, flat sheet of material which is formed into the shape of channel 31 by a conventional roll-forming machine. Where leak detection modules 30 having larger dimensions are desired, two or more sheets of material may be joined together prior to roll-forming. High density Polyethylene is a suitable material for channel 31; however, other materials known to those skilled in the art as offering the properties of strength, formability, and corrosion resistance may also be used.

Channel 31 has a generally C-shaped cross section which is open at the top and comprises bottom 32, sides 33 and 34, and connection flanges 35 and 36. Module dividers 37 are positioned transversely within channel 31 at uniform distances to form individual leak detection modules 30A and 30B. Each leak detection module 30 is substantially concave and well suited for collecting and accumulating fluid.

Each leak detection module 30 additionally comprises an aperture 38 positioned in bottom 32. Conduit 70 (not shown) extends through aperture 38 and is connected to drain assembly 76A or 76B. Drain assembly 76A or 76B rests on bottom 32 and comprises conduits which are arranged in an appropriate shape. Assembly 76A of FIG. 5(a) is arranged in the general shape of a cross. Alternatively, as shown in FIG. 5(b), the drain assembly 76 may be arranged in other configurations such as a herringbone pattern 76B. A plurality of holes 77 are located along the lower surfaces of drain assembly 76A or 76B, such that fluid present within leak detection modules 30 may enter drain assembly through holes 77 and then travel to conduit 70 (not shown). However, solid material which is too large to pass through holes 77 cannot enter drain assembly. It will be appreciated that although the holes 77 are described above as being located along the lower surfaces of drain assembly 76A or 76B, the holes 77 may also be located on the sides or top of the drain assembly, or in any location which permits the fluid to be adequately detected and drained from the leak detection module 30.

System 10 is modular and may easily be expanded over time to accommodate growth in the size of landfill 20. As indicated in FIG. 3, rows of leak detection modules 30 and cooperating conduits 70 can extend perpendicularly in both directions from access passage 60. System 10 may also be expanded by the addition of a second access passage 61 along with its cooperating leak detection modules 30 and conduits 70. System 10 may be further expanded in the direction perpendicular to access passage 60 by the addition of more access passages, leak detection modules, and conduits.

Additionally, the leak detection modules 30 may be filled with a filtering substance 39 to remove debris and particulate matter from fluid before it enters conduits 70, where it could cause blockage. Sand, gravel, and aggregate are suitable for use as filtering substance 39, as well as any other material which can perform the function of filtering.

The operation of the impoundment leak detection, location, and containment system of the first embodiment of the present invention will next be described with reference to FIG. 4(a). When a first defect 100, such as a liner separation or puncture, occurs in first liner 23, fluid 102 will escape through first liner 23 and seep downward through first clay layer 21 due to the operation of gravitational forces. Where a second defect 101 occurs in second liner 24, fluid 102 will continue to seep downward through second clay layer 22. Without the use of the present invention, fluid 102 escaping from landfill 20 would then be completely free to contaminate nearby soil and groundwater.

However, with the present invention installed below landfill 20, as fluid 102 seeps downward through second clay layer 22, it will be collected in one or more leak detection modules 30, such as leak detection module 30D in FIG. 3, which are positioned below second defect 101. Leak detection module 30D prevents the further uncontrolled seepage of fluid 102 into the environment. In addition, leak detection module 30D localizes the fluid 102 near the location of defect 101. Fluid 102 then passes through filtering substance 39 contained within leak detection module 30D and flows freely downward and laterally through conduit 70D.

The presence of fluid 102 within leak detection module 30D or conduit 70D indicates a leak has occurred in the impoundment. However, the present invention also provides information concerning the location of the leak. Each conduit 70 is connected to a single leak detection module 30. In addition, the location of each leak detection module 30 is known with respect to the overall grid 40A and with respect to landfill 20. Thus, when fluid 102 is found within conduit 70D, it is known that leak detection module 30D, the one connected to conduit 70D, is collecting fluid 102. Since the location of leak detection module 30D is known, the location of defect 101 can be identified to a small area because it will be in proximity to and above module 30D. Although defect 100 in first synthetic liner 23 will not necessarily be directly above leak detection module 30D, by knowing the location of defect 101 in second synthetic liner 24 it will be much easier to find defect 100. This could be accomplished by following the moisture inside first clay layer 21 to its source, which would be defect 100. Of course, where landfill 20 comprises only a single liner or where landfill 20 comprises no liners, system 10 will provide more precise information concerning the location of all leaks in the impoundment.

An additional advantage of the present invention is that it may be used to extract and store the fluid 102 escaping from the impoundment. An additional conduit (not shown) may be connected to end 71D inside access passage 60 and extend to a separate storage tank (not shown) located nearby. In this manner, fluid 102 may be safely extracted and stored, or otherwise processed, which will provide time to plan and undertake the appropriate remedial measures. Furthermore, if the leak is relatively small, as indicated by the amount of fluid extracted, it may be unnecessary to take any remedial measures, since the present invention substantially contains the escaping fluid 102 and prevents it from contaminating the environment.

It should be noted in the above-described embodiment that a separate conduit is connected between each leak detection module 30 and the access passage 60. Because each conduit 70 is associated with a particular leak detection module 30, and since the location of each module is known in relation to the overall impoundment, it is therefore possible to isolate the location of a leak to the region of a particular leak detection module merely by identifying which conduit contains fluid. The presence of fluid may be detected at the conduit end 71, or as will be described next, may be detected within the conduit at a point between the conduit end 71 and the leak detection module 30 by use of a mobile sensor. Furthermore, the use of a mobile sensor permits the conduit 70 to be inspected for breaks or leaks between the leak detection module 30 and the conduit end 71.

Figure 6:
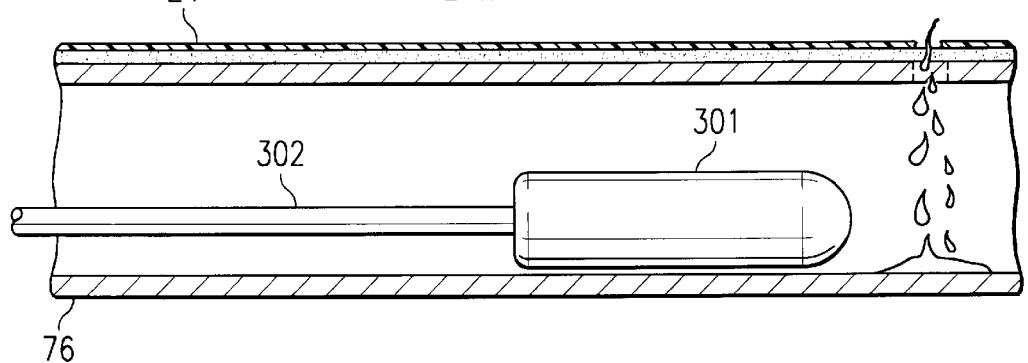
FIG. 6 is a cross-sectional side view of a mobile sensor system having a camera which is positioned inside a conduit.
Figure 7:
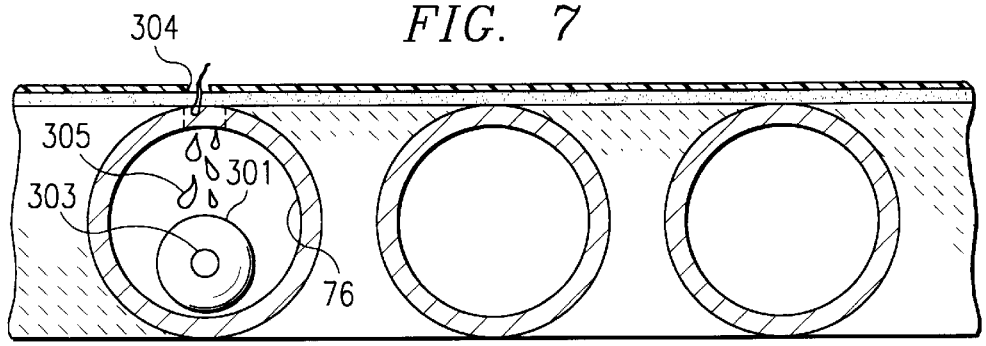
FIG. 7 is a cross-sectional front view of a mobile sensor system having a camera which is positioned inside a conduit.

Mobile Sensor System:

The mobile sensor is a system which can be deployed through the conduits for inspection and leak detection and is shown generally in FIGS. 6 and 7. The sensor system comprises generally a sensor head 301 which includes one or more sensors of various types, as well as components to either record information from the sensors or to transmit the information out to a separate recorder or display. In FIG. 6, sensor head 301 is shown with an attached cord 302 for power and data transfer. The sensor head 301 is dimensioned to pass through conduit 70 that runs beneath the impoundment and which connects each of the leak detection modules. Accordingly, the sensor head 301 may be maneuvered through the various conduits to predetermined points within the impoundment system. Specifically, the sensor head 301 may be maneuvered through the conduits 70, as well as optionally up into the drain assembly 76 located within a leak detection module 30. A mobile detection system for detecting a fire, gas leak, or other abnormal conditions in a building is described in U.S. Pat. No. 5,446,445, to Bloomfield et al., and illustrates an autonomous robot sensor which could be adapted for use in the present impoundment system.

A number of advantages are obtained by employing a sensor which can be moved through the conduit system. Among the advantages, the sensor itself may be removed for inspection, repair and maintenance which may be critical for a long-term installation where monitoring may be necessary for decades or longer. Also, because the sensor can be moved, the number of sensors required to survey the entire impoundment system is reduced. Additionally, while the leak detection structure of the above-described first embodiment can isolate a leak to the region of a single leak detection module 30 by ascertaining which conduit 70 contains fluid, when a mobile sensor is used, the location of a leak can be pinpointed with additional accuracy. Furthermore, because the location of a leak can be pinpointed, the size of each leak detection module 30 can be increased without sacrificing the ability to precisely locate a leak. As a result, fewer leak detection modules are required for a given impoundment thereby further simplifying construction and saving costs.

A more complete description of the mobile sensor follows. In particular, a wide range of sensors may be used in the sensor head to provide information about present or impending leaks, including, but not limited to, the location and severity of a leak as well as chemical information about the composition of a leak.

Specific sensors contemplated include cameras for various types of visual determinations, as well as a variety of chemical, electrical and mechanical sensors. A camera 303 is illustrated on the sensor head 301 in FIG. 7. Cameras, including both still frame and video cameras, can provide immediate information about the condition of a leak and the precise location thereof. Such a camera system can be guided through the conduit 70, beginning in the underlying access passage 60 or other access location, all the way to the drain assembly conduit 76 located within the leak detection module. By providing a visual inspection of the complete length of the conduit 70, integrity of the entire conduit system can be monitored. Also, by using cameras sensitive in various spectral bands, such as infrared, ultraviolet, or visible light, or by illuminating the scene with different wavelengths of light, additional information may be gathered relating to the composition of the leaking material, and provide information regarding the criticality of the leak. In use, a camera could detect the existence of a leak 304 by the visual presence of liquid 305, or could identify any location in the conduit having a structural failure as could result from settling or other movement in the earth. After a leak is repaired, a camera inspection can be used to confirm the effectiveness of the repair.

A camera-based sensor system may include one or more camera and light systems for imaging in various locations in front of, behind, or on the side of the sensor head 301, and may include a scale or reticle in the image field to provide size or orientation information to the viewer.

Figure 8:
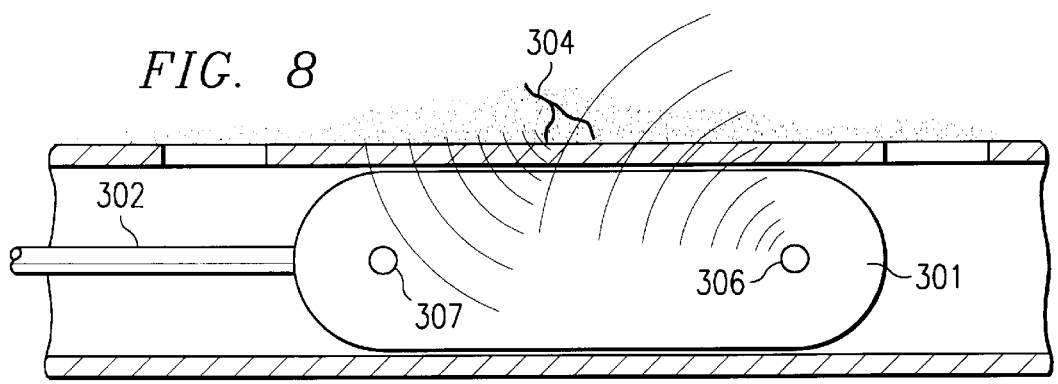
FIG. 8 is a cross-sectional side view of a mobile sensor system having an ultrasonic transceiver which is inside a conduit.

In addition to cameras, other sensors may be used including ultrasonic transceivers as well as any number of electrical, chemical, humidity, or mechanical sensors. A sensor head 301 having an ultrasonic transmitter 306 and ultrasonic receiver 307 is illustrated diagrammatically in FIGS. 8 and 9. A specific benefit of ultrasonic sensors is that they may detect conditions which are indicative of small leaks which have not yet produced sufficient liquid for visual detection, but which have nevertheless altered local soil characteristics.

By using other sensors, the items which may be monitored may include acoustic wave propagation speed, humidity, temperature, electrical conductivity, or other local conditions. By maneuvering the sensor head through locations in the conduit while recording sensor signals correlated with location, a map of the monitored conditions can be prepared. Furthermore, by comparing a series of such maps which are prepared over time, any change in local conditions which may be indicative of an actual or impending leak can be readily ascertained.

In addition to the sensors mentioned above, imaging ultrasonic transceivers may also be employed in the sensor head (not shown). These sensors, similar to those used in medical applications, transmit ultrasonic pulses into the earth and construct an image of underlying structures therein based on reflected sound waves. These sensors, or other sensors capable of imaging through solid materials, can provide additional information about the location, nature or severity of a leak where no visual indication is present.

An important aspect of the present invention is that the sensor is able to reach predetermined parts of the impoundment system for inspection and/or repair. In maneuvering the sensor head through the conduit, a number of methods and approaches may be considered so long as the movement can be controlled and the sensor location can at all times be determined. Among various options both tethered and wireless operating concepts are contemplated, and the operation may be conduced either under the remote control of an inspection operator, or may be conduced autonomously by preprogrammed computer control.

Specific examples relating to means for moving the sensor would include pushing or pulling the sensor through the conduit via an attached tether, or having the sensor equipped with wheels, tracks or other propulsion mechanisms. Sensors equipped with self-propulsion means may be operated by remote control, or as indicated previously, may operate autonomously under preprogrammed direction. The precise manner that the sensor is propelled is not the essence of the broad invention, as a number of methods of moving the sensor are contemplated. Based on local conditions, or the degree of hazard represented by the contained materials, the sensor system may be used to inspect specific conduits and leak detection modules when signs of leaks are shown, or alternatively, the sensor system may be used to inspect all conduits on a periodic basis in a program of preventative maintenance.

As noted above, the position of a leak can be ascertained when the mobile sensor identifies the presence of a leak, and the location of the mobile sensor is known at that time. It will be apparent to those skilled in the art that various approaches may be employed for tracking the location of the mobile sensor.

In the case where the mobile sensor is used with a tether, each turn that the mobile sensor makes, together with the length of tether out, may be compared to a map of the impoundment conduit system to ascertain the mobile sensor location. In the case where the mobile sensor operates in a wireless configuration, the map of the impoundment conduit system may be programmed into the mobile sensor and progress through the mapped conduit may be tracked by the mobile sensor based on monitoring propulsion wheel rotation or by other means. Although these examples are given, other means of tracking the mobile sensor known in the art may also be employed.

Second Embodiment of the Leak Detection Structure:

A second embodiment of the leak detection structure is described next where the conduit system is modified based on the use of the mobile sensor. Because the sensor can be maneuvered through the conduit 70 between the access passage 60 and the leak detection module 30, the layout of the conduit 70 in the second embodiment is simplified from that previously described. As shown in FIG. 10, the conduit 70A–70G running from each of the leak detection modules 30A–30G may be branched together before reaching a common access location such as a tunnel or well. Instead of individual conduits running to a tunnel or well, each conduit 70A–70G joins a common conduit 140 which leads to a detection/collection point 150 where fluid from any of the leak detection modules 30A–30E will accumulate. In the first embodiment, a separate conduit 70A–70G provided a unique path for fluid from the leak detection module all the way to the access passage, well, or other detection/collection point where fluid could be detected at the conduit ends 71A–71G. In this second embodiment, the presence of a leak, and the location of the leak relative to the corresponding leak detection module 30A–30G, may be determined without providing for individual sensing means at each conduit end 71A–71G. By directing the mobile sensor into any branch conduit 70A–70G from common conduit 140, a leak in a module can be detected by the presence of fluid in the corresponding branch of the conduit. Thus, by providing a sensor which can be maneuvered through the pipe, the conduits under the leak detection system can be reduced and simplified without sacrificing the abilty to determine the location of a leak.

Furthermore, the location of a leak can be pinpointed with greater accuracy with a mobile sensor. Specifically, by maneuvering the sensor into the drain assembly 76 of a leak detection module 30, the location of a leak within the leak detection module 30 may be more closely determined. By varying the configuration of the drain assembly 76, sensor coverage within the leak detection module may be further improved. For example, FIG. 5(*b*) illustrates a leak detection module 30 where the drain assembly 76 is arranged in a herringbone configuration 76B. Such an arrangement provides for greater access by a mobile sensor within the leak detection module 30. Because the mobile sensor can be maneuvered into each branch of the herringbone configuration drain assembly 76B, such a configuration provides for more precise pinpointing of a leak.

Figure 11:
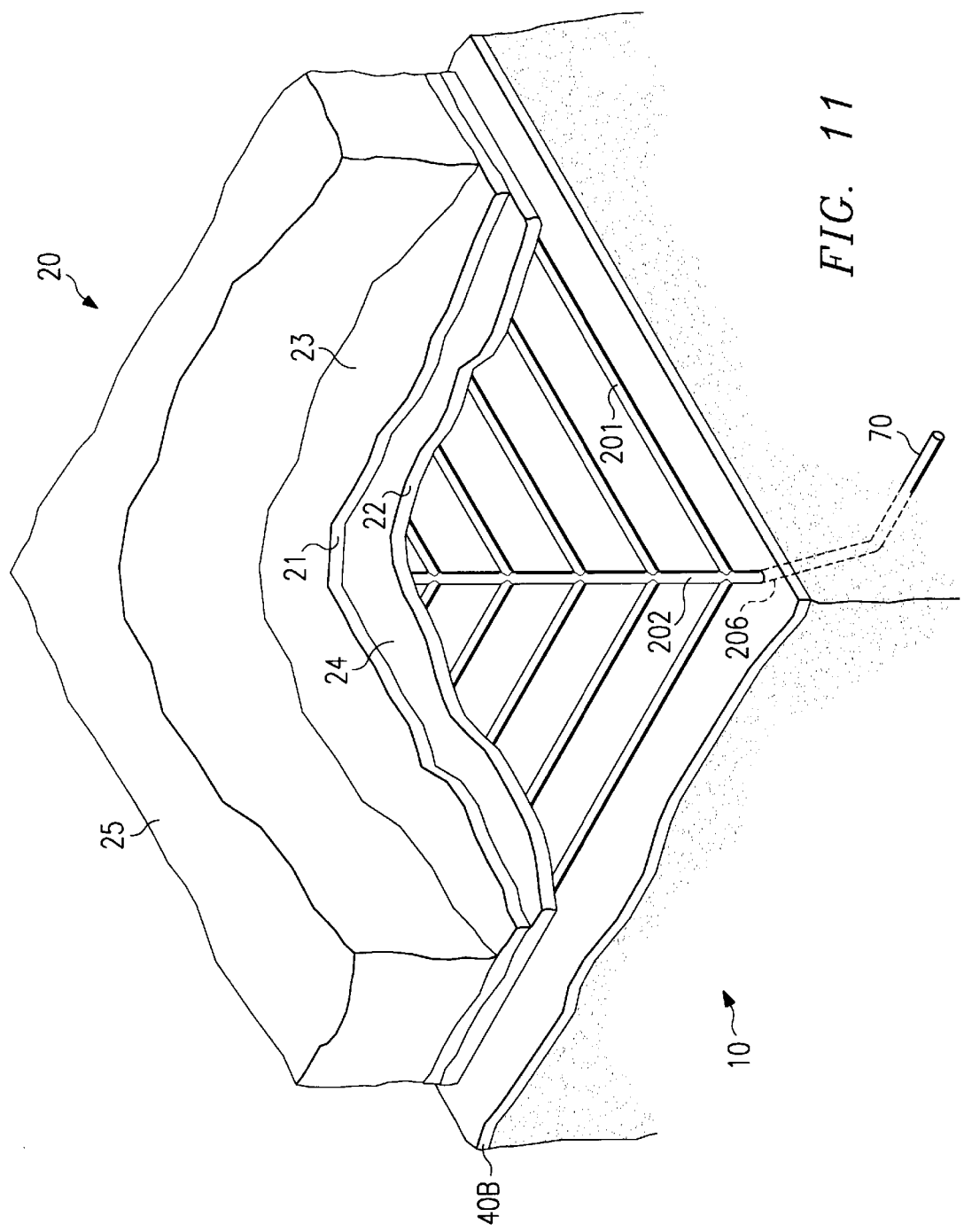
FIG. 11 is a perspective view of a third embodiment of the present invention in place below an impoundment with portions of the impoundment removed.
Figure 12:
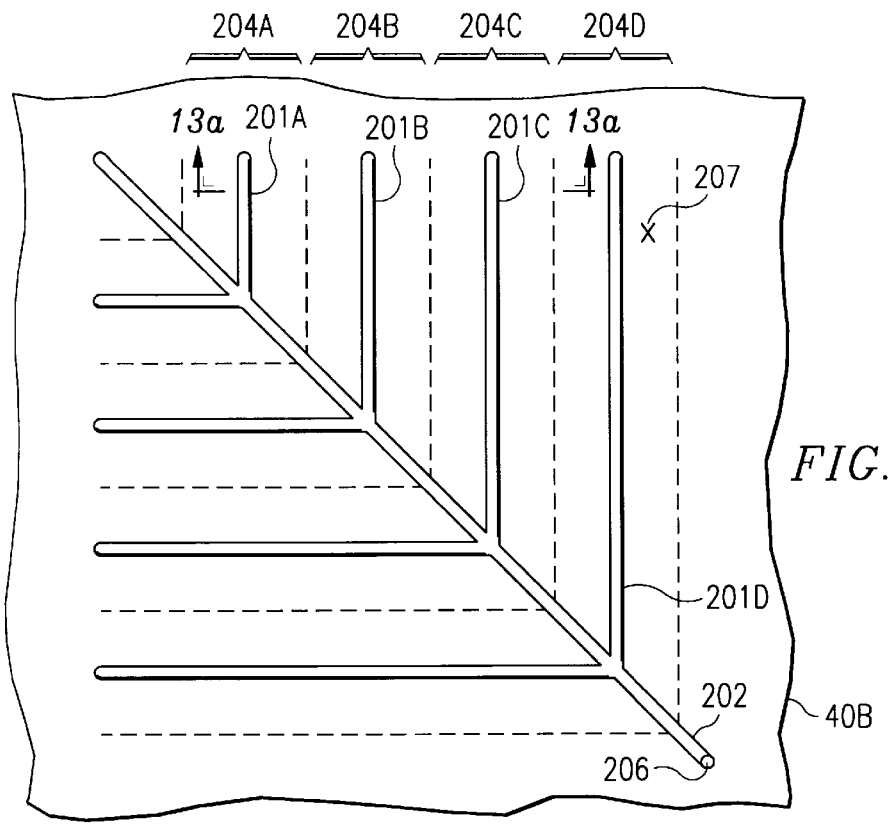
FIG. 12 is a plan view of a third embodiment of the present invention in place below an impoundment with portions of the impoundment removed.
Figure 13A:
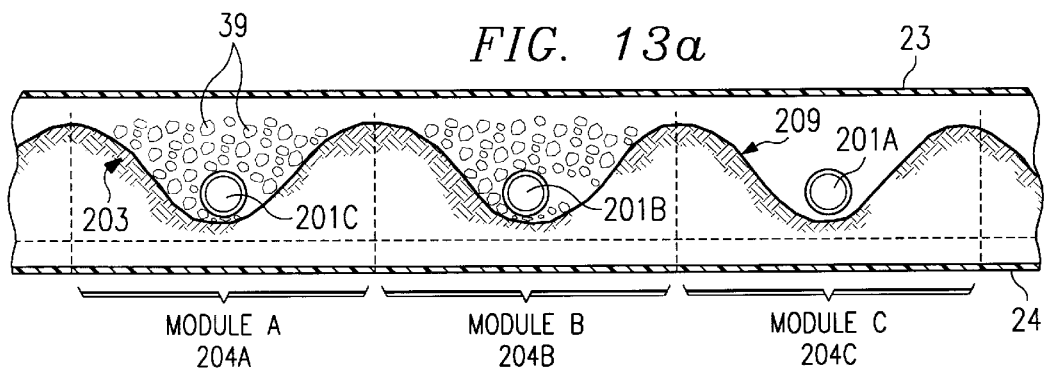
FIG. 13(a) is a partial cross-sectional view of the third embodiment of the present invention showing the branch conduits and the intervening filler of low permeability material.

Third Embodiment of the Leak Detection Structure:

A third embodiment of the leak detection structure 40 is shown in FIGS. 11–13. As described in the previous embodiments, the purpose of leak detection structure 40 is to form a structure extending below landfill 20 to detect and localize a leak in first liner 23 and second liner 24. Referring to FIG. 11, it can be seen that leak detection structure 40B of the third embodiment consists of a large herringbone pattern (or other layout) of conduit having a multitude of branch conduits 201, and a main or stem conduit 202 to which each of the branch conduits 201 are connected. Stem conduit 202 extends across leak detection structure 40B to junction 206 where it connects to conduit 70 which extends beneath the impoundment.

FIG. 12 is an elevation view of leak detection structure 40B. Referring to the figure, it can be seen that each branch conduit 201A–201D is at the centerline of a leak detection zone 204A–204D. Each leak detection zone 204 is the region on either side of a branch conduit 201 where a fluid leak above that zone would tend to flow to the corresponding branch conduit. For instance, a fluid leak 207 above leak detection zone 204D would tend to accumulate fluid in branch conduit 201D rather than migrate between zones 204D and 204C to accumulate in another branch conduit. In a preferred structure, the herringbone conduit pattern would be sloped slightly to promote drainage of fluid from the branch conduits 201 into the stem conduit 202, and through the stem conduit 202 to the junction 206 where it would drain through conduit 70 which extends beneath the impoundment.

FIG. 13(*a*) shows a partial cross-section view of leak detection structure 40B along the line 13*a*—13*a* of FIG. 12 and illustrates three of the branch conduits 201A–201C and the intervening space between the branch conduits. A filler of low permeability material such as bentonite clay 203 is used between the conduit branches 201A–201C to define separated leak detection zones 204A–204C. Space along each branch conduit 201 may be filled with a filtering substance 39 to remove debris and particulate matter from fluid before it enters conduits 201, where it could cause blockage. An optional layer 209 may separate the bentonite clay 203 and the filtering substance 39 to prevent the filtering substance from becoming choked with clay particles. The conduit forming the stem of the herringbone conduit pattern 202 is a drain which connects to the conduit 70 running to the access location. The result of this structure is that each conduit branching from the stem 202 forms a separate leak detection zone 204. The low permeability material 203 between branches 201 acts as a separating barrier substantially preventing migration of fluid horizontally between zones. Fluid leaks are thus effectively localized to each of the defined zones since a leak will follow the path of least resistance and flow into the nearest conduit 201.

In the above-described third embodiment, the location of a leak can be determined relative to the herringbone structure with the mobile sensor by detecting the presence of fluid in any branch conduit 201 or by pinpointing a leak with a visual or other type of sensor. Certain advantages are realized with the structure of the third embodiment. First, like in the second embodiment, this structure avoids the need to have a separate conduit 70 from each individual leak detection zone 204 that runs all the way to a separate outlet associated with that module at the access location in order to determine the location of a leak. Second, this configuration permits simplified construction because a grid of leak detection zone can be formed in place during impoundment construction using conventional earth-moving equipment and materials. Specifically, the leak detection zones 204 are formed by arranging the conduit 201 and 202 in a proper configuration and then filling the area between conduits with a low permeability material 203.

Although the filler of low permeability material 203 illustrated in FIGS. 11–13 is shown between the branch conduits and extending parallel to the branch conduits, the filler may also be arranged in a two-dimensional rectangular grid. In this approach, rows of filler material are arranged parallel to the branch conduits as well as transverse to the branch conduits. Space between the parallel and transverse rows of filler may be filled with sand or aggregate and thereby form smaller rectangular leak detection zones for further isolating a leak location.

Figure 13B:
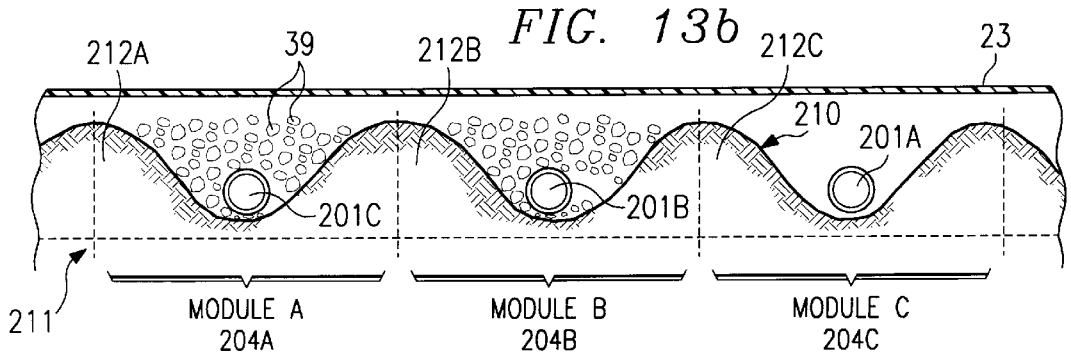
FIG. 13(b) is a partial cross-sectional view of the third embodiment of the present invention showing a variation on the structure of forming the leak detection zones between the branch conduits.

An alternative structure for forming leak detection zones is illustrated in FIG. 13(b). FIG. 13(b) shows a partial cross-section view of leak detection structure 40B and illustrates three of the branch conduits 201A–201C and the intervening space between the branch conduits. Underlying earth 211 has been formed during construction into a series of low dike-like mounds 212A–212C. A liner 210 covers the mounds 212A–212C to form a series of trenches in which the branch conduits 201A–201C are arranged. Thus, in this structure, the separated leak detection zones 204A–204C are formed by the liner covered mounds. As like the previous structure, space along each branch conduit 201 may be filled with a filtering substance 39 to remove debris and particulate matter from fluid before it enters conduits 201, where it could cause blockage. The liner 210 between branches 201 acts as a separating barrier substantially preventing migration of fluid horizontally between zones. Fluid leaks are thus effectively localized to each of the defined zones since a leak will follow the path of least resistance and flow into the nearest conduit 201.

It should be noted that the specific arrangement of conduit can be adapted based on local terrain and soil characteristics; however, one possible arrangement would include a single herringbone pattern for the whole impoundment as shown in FIGS. 11 and 12, wherein each branch forms one or more leak detection zones 204 based on the layout of the low permeability filling. This arrangement has the advantage of easy navigation for a mobile sensor system and simplified construction. For larger impoundments, two or more herringbone patterns of conduit may be constructed under a single impoundment as shown in FIG. 14.

FIG. 14 illustrates a cut-away view of a large impoundment having a leak detection structure 40C extending below landfill 20. Referring to FIG. 14, it can be seen that leak detection structure 40C consists of several herringbone patterns of conduit, each layout having a center stem conduit 202A–202D which extends across a portion of the leak detection structure 40C. Each stem conduit 202A–202D extends to a junction 206A–206D where it connects to a conduit 70A–70D which extends beneath the impoundment. Each stem conduit 202 within a herringbone conduit pattern has a multitude of branch conduits 201 extending outward which are illustrated, but not numbered, in FIG. 14. Each of the several herringbone patterns of conduit are separated from the others by a dike 213 which reduces horizontal fluid migration from the region of one herringbone conduit layout to an adjacent one. Dike 213 may be a mound of low permeability material such as bentonite clay, either alone or covered with a liner, or may be a member made from a polymeric material or other substantially impermeable compound.

With this structure, the location of a leak can be determined within any of the herringbone structures by maneuvering the mobile sensor through the conduit system. As was previously described, the mobile sensor can determine the location of a leak by detecting the presence of fluid in any branch or by pinpointing a leak with a visual or other type of sensor.

Figure 15A:
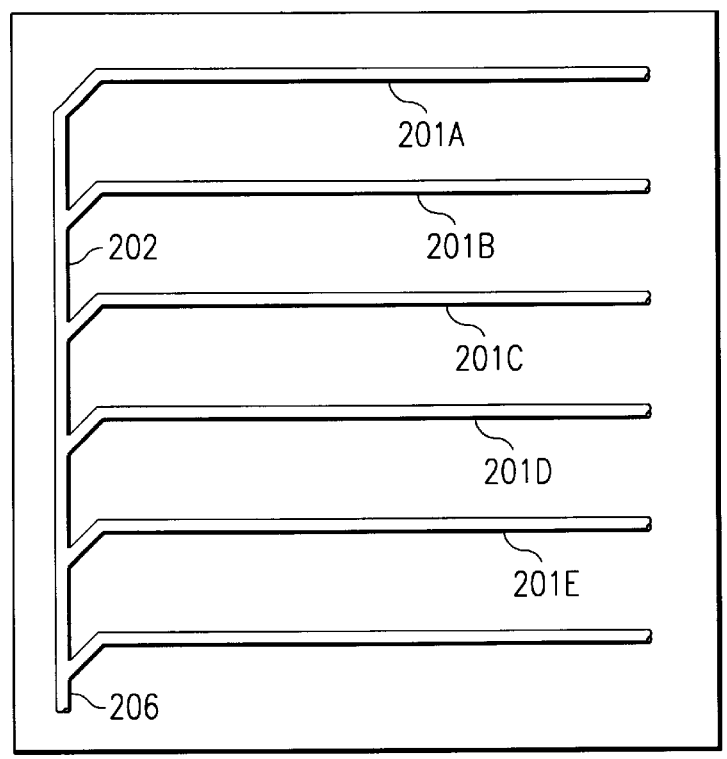
FIG. 15(a) is a plan view of a first alternative conduit layout.
Figure 15B:
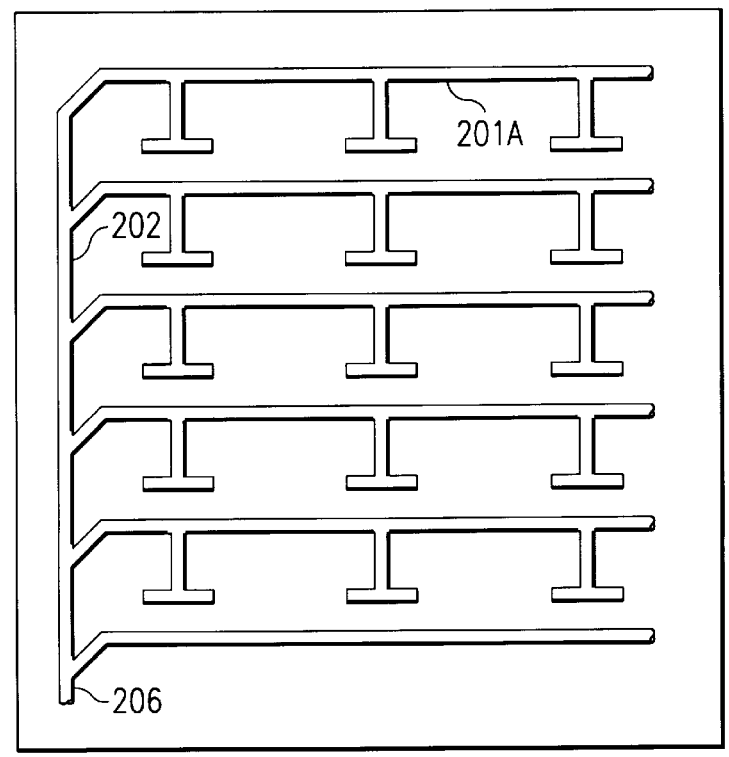
FIG. 15(b) is a plan view of a second alternative conduit layout.

It should be noted that although a herringbone conduit arrangement is shown in the figures and description of the third embodiment, it will be appreciated that other conduit routing arrangements apparent to those skilled in the art are also possible. Alternative conduit arrangements may include conduit laid out in parallel rows as shown in FIG. 15(a), or conduit rows further including sub-branches as shown in FIG. 15(b).

In one conduit configuration discussed above, the conduits are arranged within the leak detection system in a herringbone pattern. Accordingly, adjacent branch conduits 201 extend parallel to each other on either side of the stem conduit 202. Although other conduit configurations are contemplated, a benefit of configuring the branch conduits 201 in a series of spaced apart parallel branches is that pairs of sensor transmitter/receivers may be maneuvered adjacent to each other in the parallel branches so that sensor signals from an appropriate sensor can be transmitted from one sensor to the other through the intervening filter material. In this approach, one sensor head may include a transmitter and the other sensor head a receiver, or both sensor heads may contain both transmitters and receivers. By transmitting various acoustic, electrical, or other signals through the intervening material, additional information about present or impending leaks may be determined. For sensing some conditions, a transmitted signal may provide better information than a reflected one. For example, the speed of a sound pulse measured between two sensors can provide information about intervening soil density. Since the density can be affected by the moisture content, a change in sound propagation speed indicates a change in soil conditions which may signal the presence of a leak.

Figure 16:
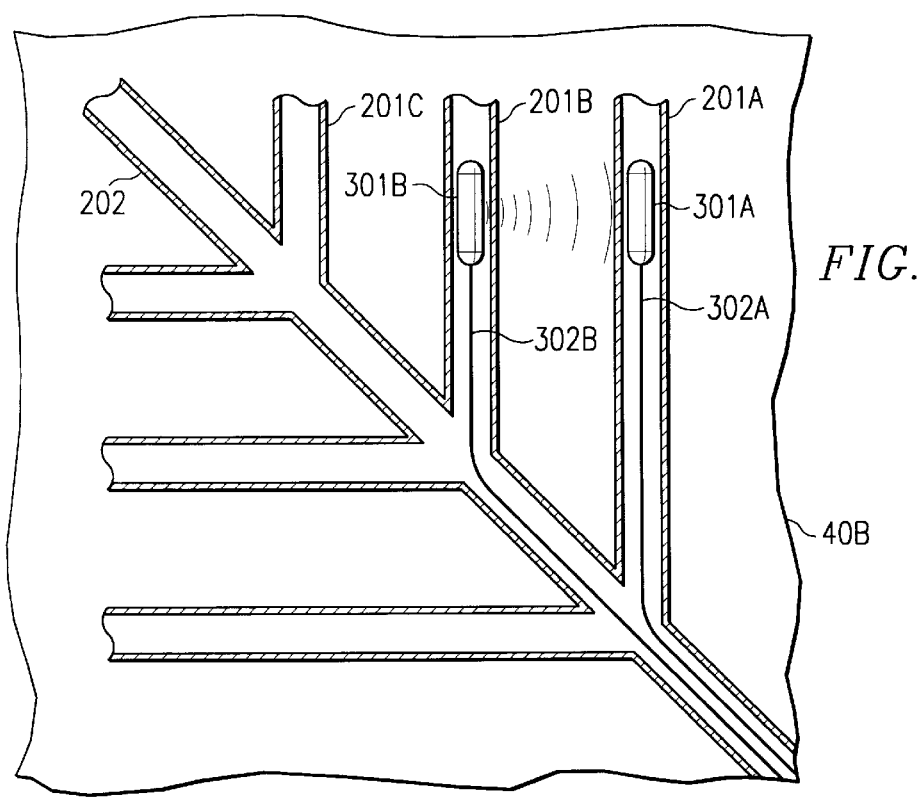
FIG. 16 is a plan view of a portion of the leak detection structure showing a portion of several branch conduits and mobile sensor heads maneuvered into adjacent parallel branch conduits.

FIG. 16 illustrates a portion of leak detection structure 40B or 40C showing part of the stem conduit 202 and a portion of several branch conduits 201A–201C. In this figure, mobile sensor heads 301A and 301B have been maneuvered into adjacent parallel branch conduits 201A and 201B so that a sensor signal from one sensor head 301B may be received by the other sensor head 301A after having been transmitted through the material between the branch conduits.

Figure 17:
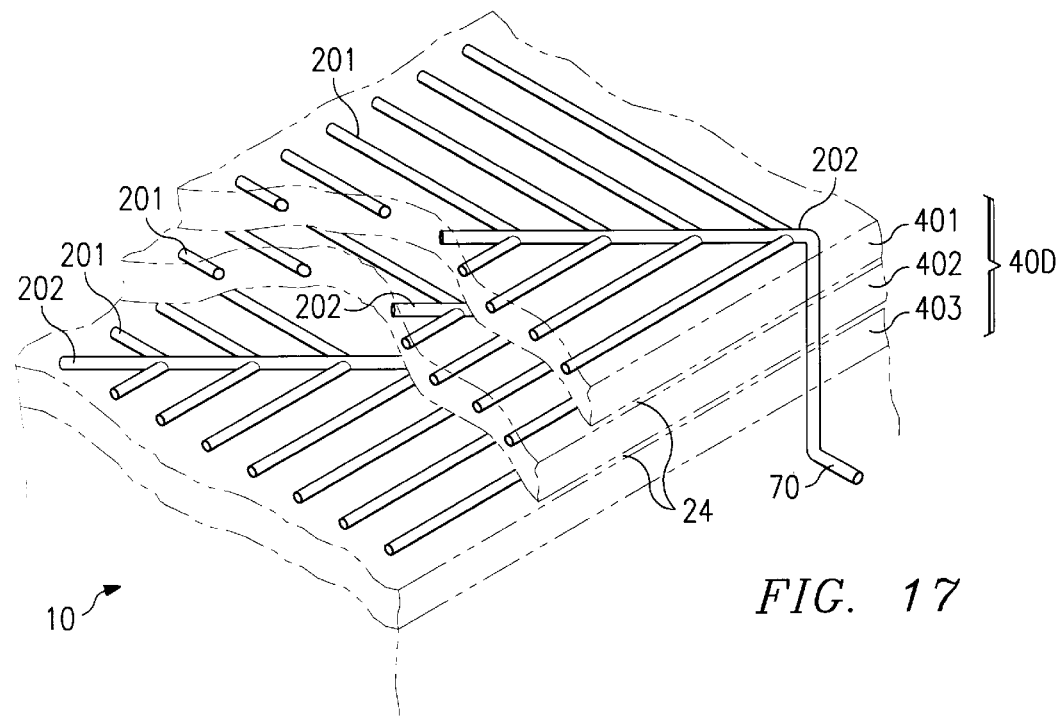
FIG. 17 is a perspective view of the fourth embodiment of the present invention in place below an impoundment with the impoundment removed illustrating stacked leak detection structures.
Figure 18:
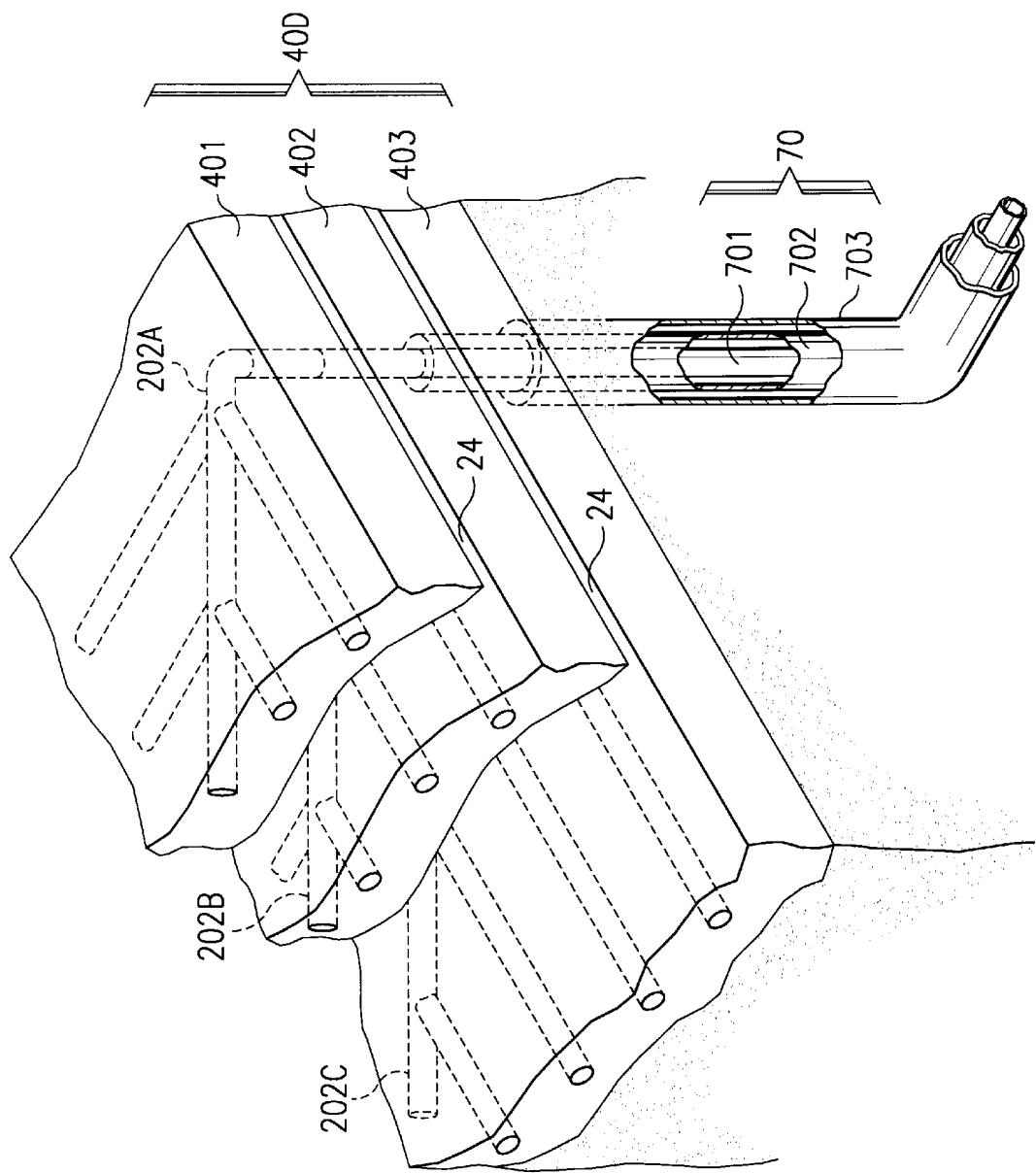
FIG. 18 is a magnified partial perspective view of the fourth embodiment of the present invention in place below an impoundment illustrating nested conduit pipes from adjacent leak detection structure layers.

Fourth Embodiment of the Leak Detection Structure:

A fourth embodiment of the leak detection structure will be described next with reference to FIGS. 17–18. FIGS. 17 and 18 illustrate a leak detection structure 40D which employs two or more stacked layers of leak detection conduit systems 401–403, each separated by a liner 24. By providing one, two, or more layers of stacked leak detection structures, the degree of protection offered by the present invention may be tailored to the level of risk posed by the specific material impounded.

FIG. 17 illustrates this configuration with the landfill 20 removed for clarity. In this structure, the impoundment system 10 employs a leak detection structure 40D which includes two or more stacked layers of leak detection conduit systems 401–403 each separated by a liner 24. Each leak detection conduit system 401–403 is structurally very similar to the leak detection structure 40B of the above-described second embodiment. Each leak detection conduit system 401–403 consists of a herringbone pattern (or other layout) of conduit having a multitude of branch conduits 201, and a main or stem conduit 202 to which each of the branch conduits 201 are connected. A filler of low permeability material such as bentonite clay 203 is used between the conduit branches 201 to define separated leak detection zones. Space along each conduit branch 201 may be filled with a filtering substance 39 to remove debris and particulate matter from fluid before it enters branch conduit 201, where it could cause blockage.

The conduit forming the stem of the herringbone conduit pattern 202 in each layer is a drain which connects to a conduit 70 running to the access location. Although a number of routing arrangements of conduit 70 are contemplated, one arrangement which minimizes the number of perforations in the liner 24 is to have the drains from each layer combine and run inside each other as illustrated in FIG. 18. FIG. 18 is a partial view of the fourth embodiment of the leak detection structure showing the leak detection structure 40D consisting of stacked leak detection conduit systems 401–403. For each leak detection conduit system 401–403, the corresponding stem conduit 202A–202C connects to a corresponding conduit 701–703 which extend below the impoundment. As can be seen in the figure, conduit 701 extends from the uppermost leak detection conduit system 401, and is of relatively smaller diameter. Conduit 702 extends from the middle leak detection conduit system 402, and is of intermediate diameter. Conduit 703 extends from the lower leak detection conduit system 403, and is of the largest diameter. As conduit 701 extends downward from leak detection conduit system 401, it enters conduit 702 and runs inside or nests within conduit 702. Then, as conduit 702, with conduit 701 inside, extends downward it enters conduit 703 so that conduit 703 then contains both conduits 701 and 702. As noted above, this nested conduit configuration minimizes the number of perforations in liner 24.

In this structure each stacked layer is separated by an impermeable liner 24. By providing one, two, or more layers of stacked leak detection structures the degree of protection offered by the present invention may be tailored to the level of risk posed by the impounded material. Additionally, the stacked system provides a high degree of monitoring capability as the integrity of each of possibly several liners can be separately monitored. Such an approach may be necessary to assure containment of the most highly hazardous materials. Thus, by scaling the level of protection to the degree of risk, an optimum economic solution may be obtained.

Figure 19:
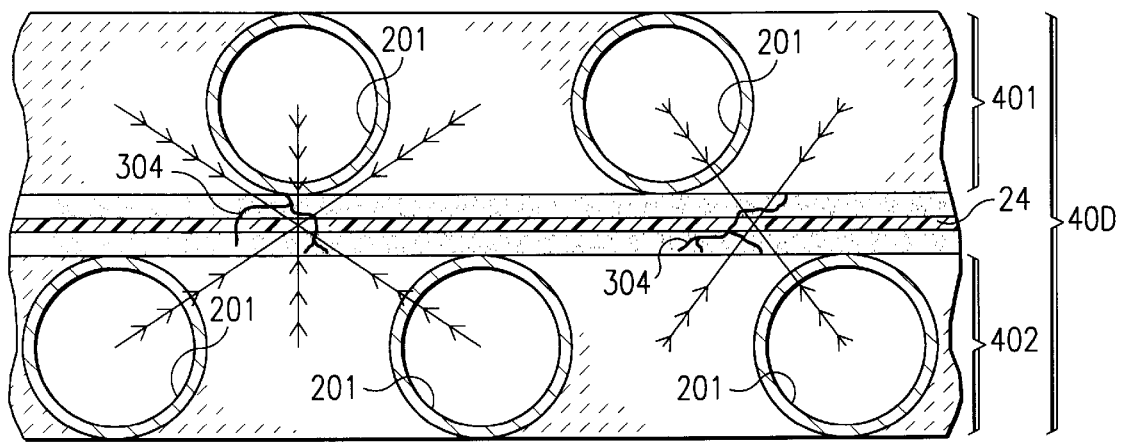
FIG. 19 is a partial cross-sectional view of a stacked leak detection structure with branch conduits having a staggered configuration.

It should also be noted that in this system, adjacent stacked layers of leak detection modules may have their conduit branches 201 staggered relative to each other so that the distance between branch conduits on adjacent layers is minimized. A partial cross-section of a staggered layout of conduit is shown generally in FIG. 19.

Figure 20:
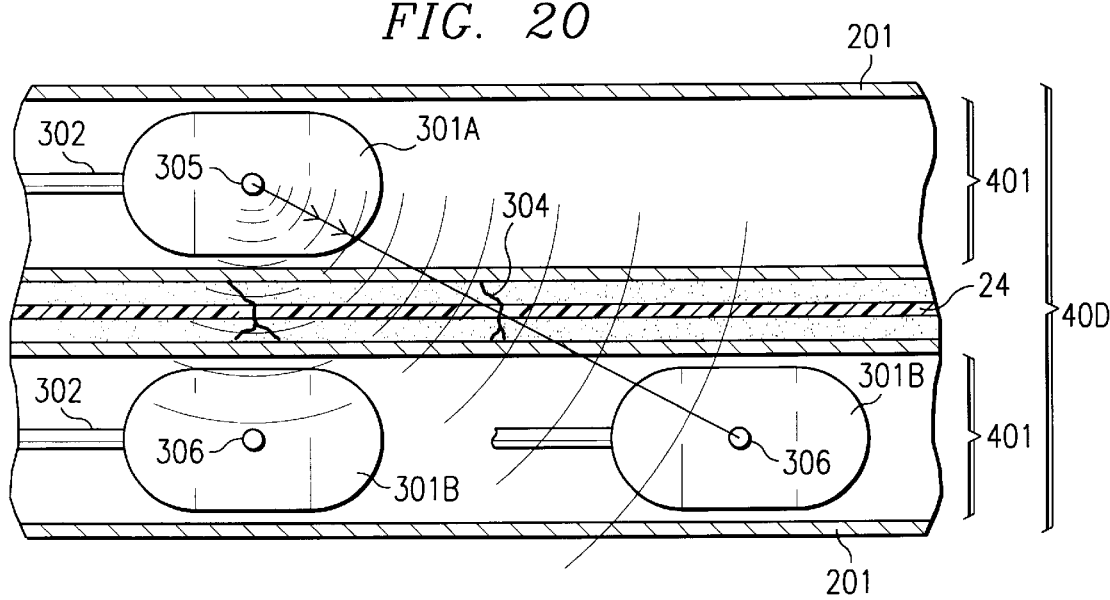
FIG. 20 is a cross-sectional side view of a stacked leak detection structure where a transmitter mobile sensor is positioned within the upper conduit and a receiver mobile sensor is positioned within the lower conduit.
Figure 21:
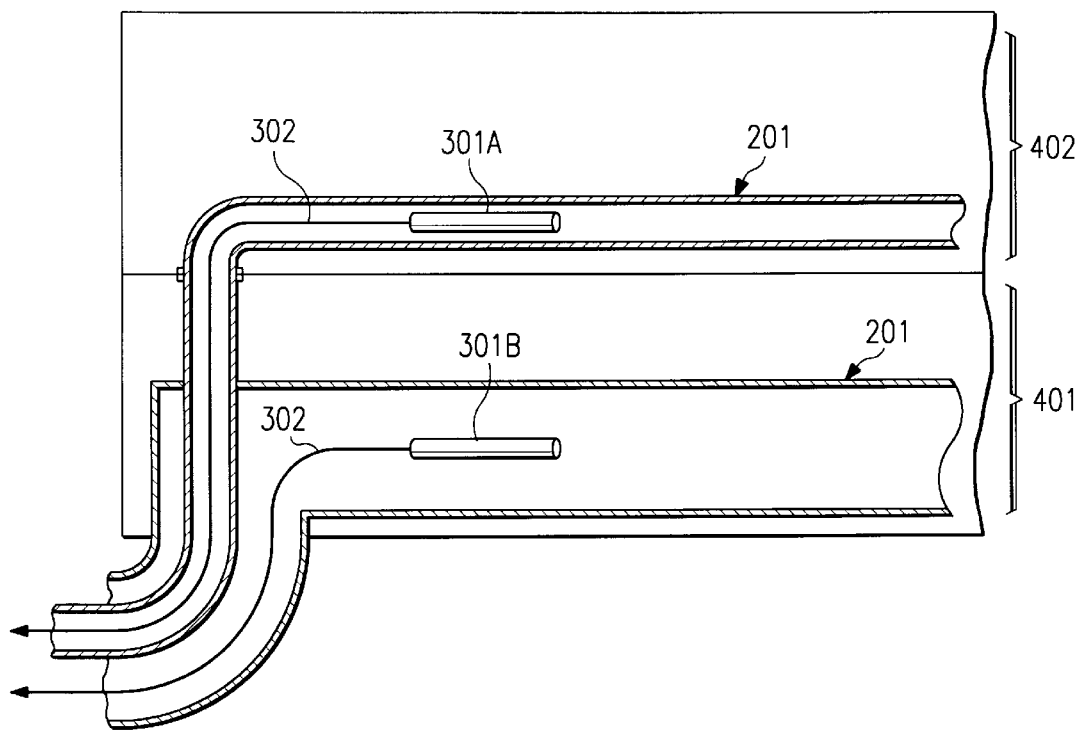
FIG. 21 is a cross-sectional side view of a stacked leak detection structure where separate mobile sensors are positioned within the upper conduit and lower conduit.

In the approach employing two or more layers of conduits, pairs of sensor transmitter/receivers may be maneuvered adjacent to each other in parallel conduits, but on opposite sides of the liner, so that sensor signals can be transmitted between them through the liner. This concept is illustrated generally in FIGS. 20 and 21. By transmitting various acoustic or electric signals through the liner, additional information about present or incipient failures may be determined. The layout of the conduit above and below the liner can be optimized for the types of sensors to be used as well as to provide most effective coverage of the entire impoundment liner.

Figure 22:
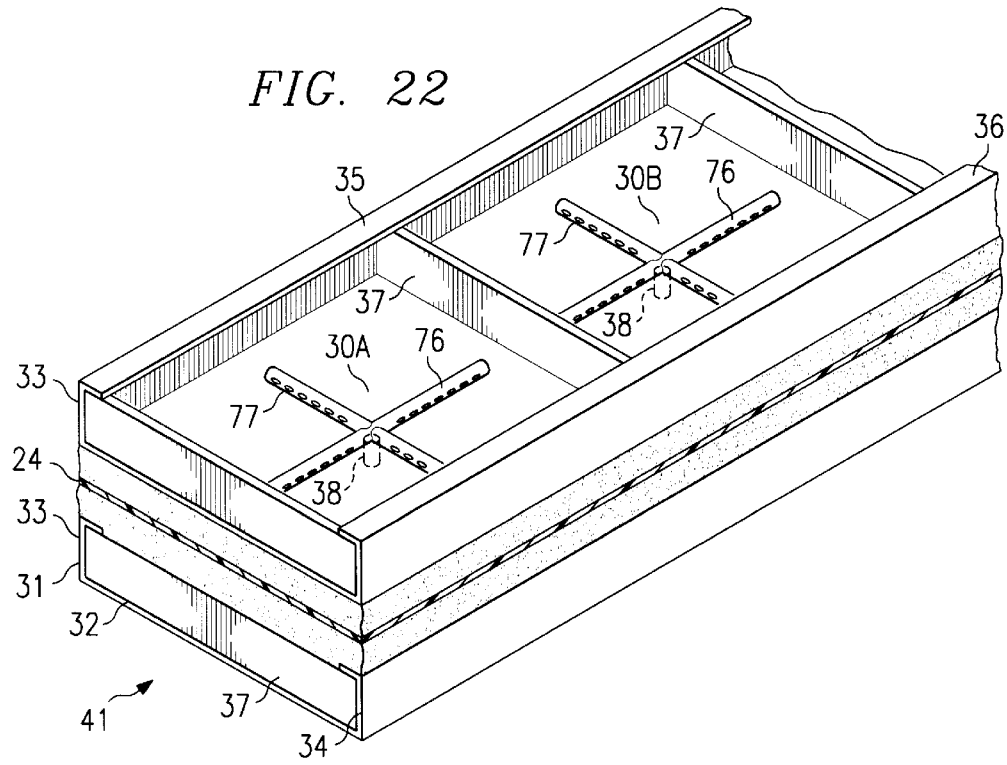
FIG. 22 is a perspective view of a stacked layer of leak detection modules.
Figure 23:
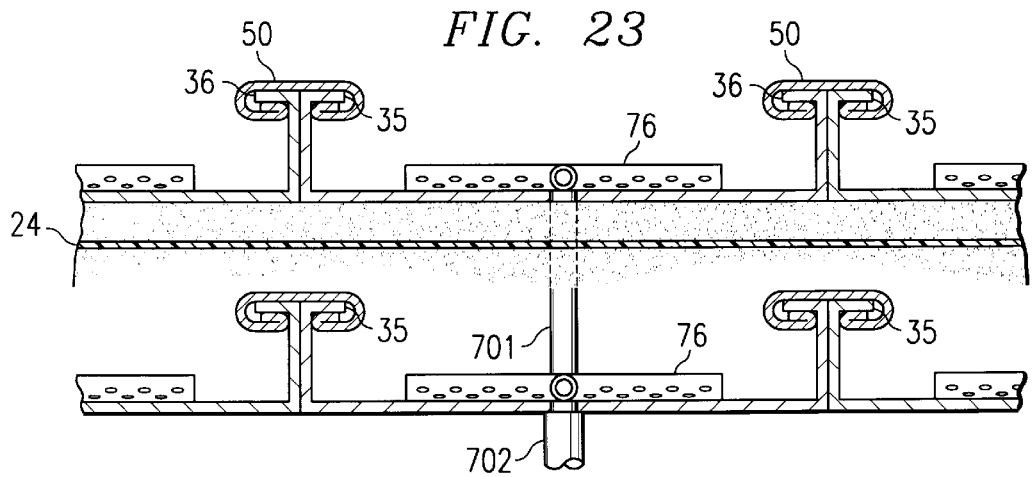
FIG. 23 is a cross-sectional view of a stacked layer of leak detection modules.
Figure 24A:
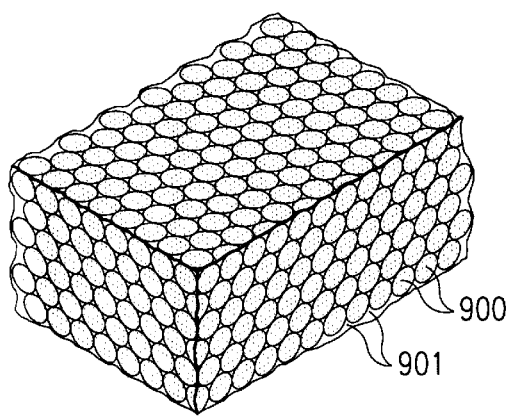
FIGS. 24(a)–24(d) illustrate various compositions of a hydrocarbon reacting compound consisting of a blend of materials.
Figure 24B:
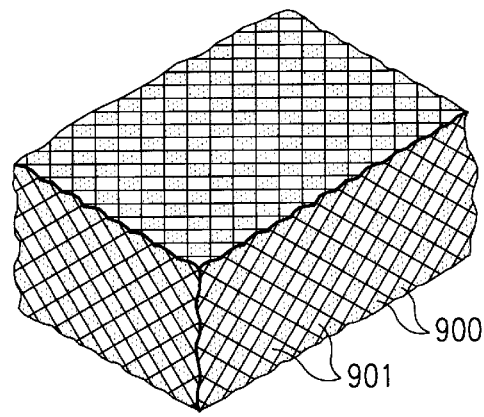
Figure 24C:
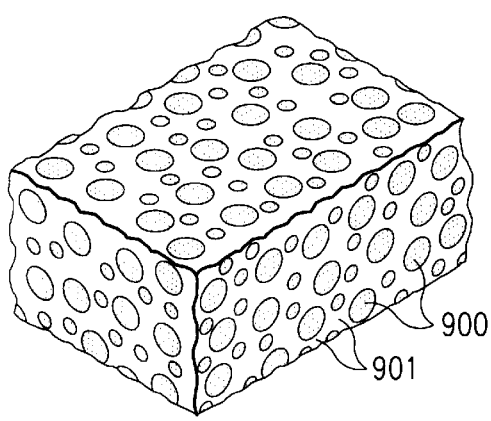
Figure 24D:
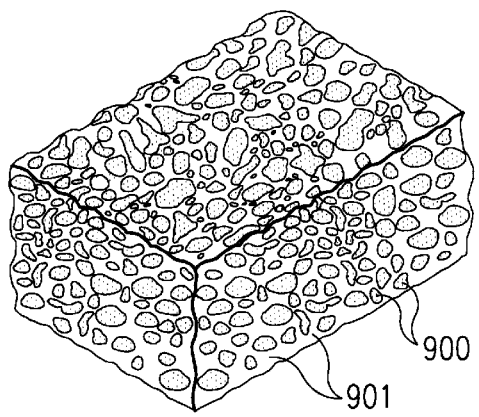
Figure 25A:
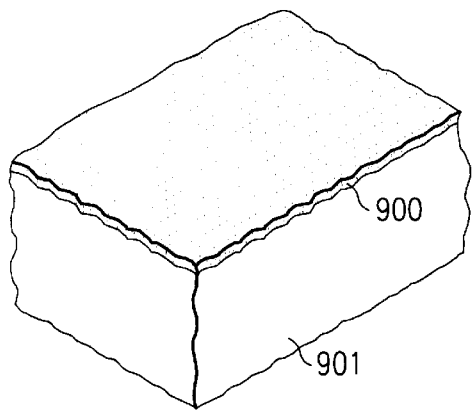
FIGS. 25(a)–25(e) illustrate various combinations where the hydrocarbon reacting compound and the bentonite/sodium bentonite clay layers may be combined.
Figure 25B:
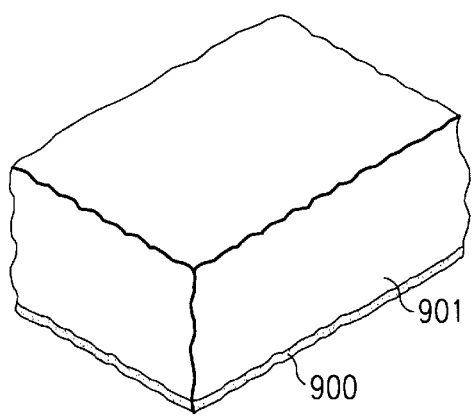
Figure 25C:
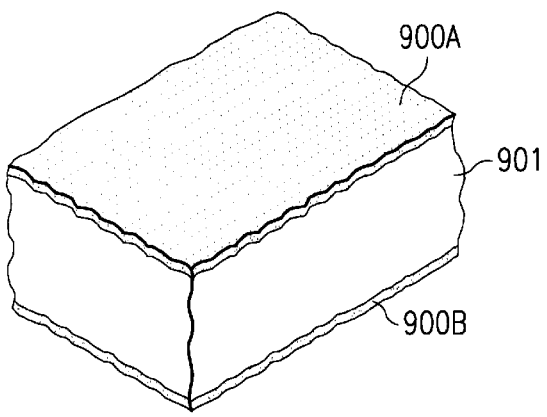
Figure 25D:
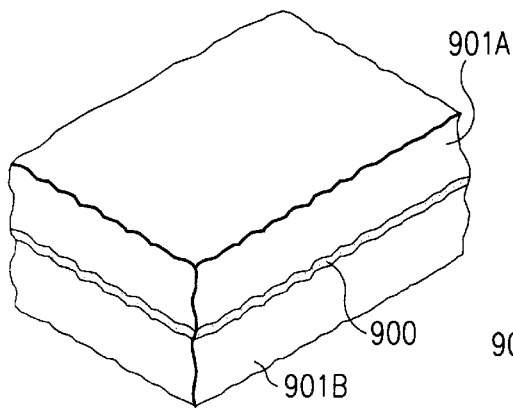
Figure 25E:
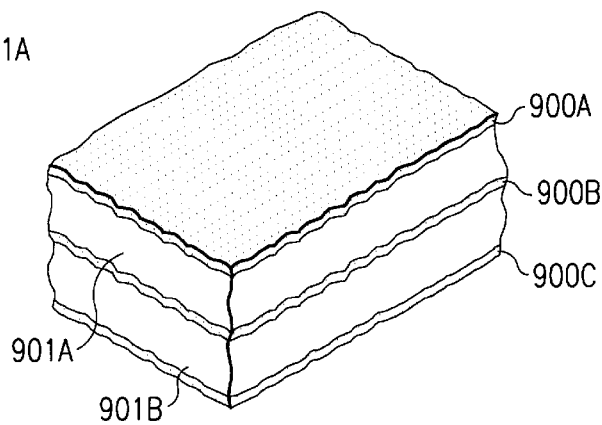

Although the stacked layer configuration described above shows stacked layers of conduit arranged in a herringbone pattern with a filler of low permeability material between the conduit branches 201 to define separated leak detection zones, any of the first through third embodiments of the leak detection structure 40A–40C may be formed in a stacked system. For example, a second configuration would stack two leak detection modules 30 of the first embodiment with a liner 24 between them as shown generally in FIGS. 22 and 23. Like the first configuration, the drain conduits 701 and 702 of the second configuration may be arranged so that the conduit 701 from the upper layer runs inside the conduit 702 from the lower layer to minimize the number of perforations in the liner 24. In addition to the examples shown where stacked layers each employ the same embodiment of the present invention, different embodiments of the present invention may be employed together in stacked layers.

Fifth Embodiment of the Leak Detection Structure:

Each of the four embodiments of the leak detection structure which have been described above are positioned under the impoundment beneath one or more liners 23 and 24. It should be noted, however, that any of the above-described leak detection and conduit structures of the present invention may also be positioned beneath the landfill 20, but above the first liner. (Not illustrated) This configuration is useful when fluid leaching through the landfill 20 must be sampled or collected for monitoring or analysis purposes.

In such a structure any fluid which leaches through the landfill does not accumulate on the first liner, but is carried away in the conduit structure. This is in contrast to the conventional impoundment where leaching fluid accumulates above the first liner until a separation or puncture occurs at which point the accumulated fluid immediately can leak into the underlying structure.

Additionally, this structure permits the permeability of the impounded materials to be determined and provides information about the quantities of hazardous materials that are leaching out into the water.

Fluid which leaches through the landfill and is drained by the conduit system may be collected for disposal or processing or may be evaporated with the residue returned to the landfill. Over time, leaching water may remove a sufficient quantity of hazardous materials from the landfill so that the risk posed by the impoundment is reduced.

In addition to positioning a leak detection structure above a first liner in a conventional impoundment, a first leak detection and conduit structure may be positioned above the first liner for fluid sampling, with a second leak detection and conduit structure positioned beneath the first liner so that leaks in the liner may be detected.

Sealing Compounds:

An additional aspect of the present invention is a sealing compound which may include one or more components particularly applicable for impoundments intended to contain, for instance, hydrocarbon compounds among other substances. The sealing compound includes at least one material having an affinity, absorptive characteristic, or chemical reactiveness for hydrocarbons, so that the compound tends to slow or seal a leak when exposed to leachate containing hydrocarbons. In the following description of a preferred embodiment, this sealing compound will be referred to as including a hydrocarbon reacting compound; however, the actions of the hydrocarbon reacting compound upon exposure to a leachate containing hydrocarbons are contemplated to include not only chemical reactions and/or absorption, but also attraction, surface coating, or other chemical or physical processes which tend to impede the flow of hydrocarbon compounds in a leachate. Additionally, it will be apparent to those in the art that a selective sealing material is not limited to hydrocarbon compounds, but is generally applicable to any sealing compound including one or more materials selected for having an affinity or reactiveness for the specific compound(s) to be impounded.

Impoundment systems, including those of the present invention as described above, may be constructed with one or more liners 23 or 24, and with a layer of clay 21 or 22, or some other material having a low permeability, placed between the liners. A low permeability material conventionally used in impoundments is a dry clay referred to as bentonite clay or sodium bentonite, where the latter is formed from the dry clay blended with a sodium compound. Bentonite clay is a mined and processed clay material which contains, in addition to montmarillonite as the main mineral, associated minerals such as quartz, mica, feldspar, pyrites and lime, as well as other minerals. When used in an impoundment system, the bentonite clay has a response to contact with water of swelling and therefore tends to seal off, to some extent, a leak in the impoundment. Sealing is achieved by further reducing the permeability of the clay, by swelling pressure which tends to close or reduce a separation or puncture in the liner, and by absorption of water by the clay. Because bentonite has some ability to seal off small leaks, it has conventionally been used in impoundments as a backup for the impermeable liner.

Although bentonite has a swelling effect when exposed to water, other leachates, including hydrocarbon compounds, do not cause bentonite to swell appreciably. Thus, bentonite clay helps prevent water leaks but does not help retain other hazardous liquids or compounds. Accordingly, in impoundments where a leachate is likely to contain hydrocarbons, or other hazardous substances, bentonite clay alone cannot perform as a suitable backup for the impermeable liner.

One embodiment of the present invention consists of a hydrocarbon reacting compound which may be used by itself or blended with bentonite clay as a replacement for the clay layer in the impoundment. Although it will be apparent to those skilled in the art that many substances have an affinity or reactiveness for hydrocarbons, the present inventor has found that various rubber compounds including uncured and cured natural rubber and uncured and cured synthetic rubber compounds may be used to absorb hydrocarbons and seal leaks containing hydrocarbons.

A preferred embodiment of the present invention consists of a granulated mixture of uncured or cured natural rubber or uncured or cured synthetic rubber and bentonite clay. The proportion of rubber to clay is determined based on the expected composition of the leachate. Where the leachate is expected to contain a high percentage of water, a mixture of about 2% to about 25% rubber and about 75% to about 98% clay, for example, may be used. Where the leachate is expected to contain a higher percentage of hydrocarbons, a greater percent of rubber may be used. In some situations, a 75% rubber to 25% clay mixture, for example, may be used. The desired effect is for the rubber and clay to meet with and/or absorb any leaching liquid and swell in response, thereby impeding, absorbing or sealing off the leak. The above-mentioned proportions are given as examples. In use, the ratio of the two compounds are varied based on the expected leachate composition.

FIGS. 24(*a*)–24(*d*) illustrate various blended combinations where hydrocarbon reacting compound 900, and the bentonite/sodium bentonite clay material 901 may be combined. FIG. 24(*a*) illustrates an approximately 50%–50% mix of hydrocarbon reacting compound 900 and the bentonite/sodium bentonite clay material 901. FIG. 24(*b*) illustrates that the two compounds may be mixed in a regularized structure. FIG. 24(*c*) illustrates an approximate 25%–75% mix of hydrocarbon reacting compound 900 and the bentonite/sodium bentonite clay material 901. FIG. 24(*d*) illustrates an approximate 75%–25% mix of hydrocarbon reacting compound 900 and the bentonite/sodium bentonite clay material 901.

In addition to forming a blended mix of clay and hydrocarbon reacting compounds, the clay and hydrocarbon reacting compounds may be layered together so that a layer of hydrocarbon reacting compound may be placed on one or both sides of a clay layer, or a clay layer may be placed on one or both sides of a hydrocarbon reacting compound layer.

FIGS. 25(*a*)–25(*e*) illustrate various combinations where hydrocarbon reacting compound layers 900, and bentonite/sodium bentonite clay layers 901 may be combined. FIG. 25(*a*) shows a hydrocarbon reacting compound layer 900 above a layer of bentonite clay 901. FIG. 25(*b*) shows an alternative configuration where the hydrocarbon reacting compound layer 900 is underneath the bentonite clay layer 901. FIG. 25(*c*) illustrates two hydrocarbon reacting compound layers, one hydrocarbon reacting compound layer 900A on top of bentonite clay layer 901, and a second hydrocarbon reacting compound layer 900B on the bottom of bentonite clay layer 901. FIG. 25(*d*) illustrates two bentonite clay layers, one bentonite clay layer 901A on top of hydrocarbon reacting compound layer 900, and a second bentonite clay layer 901B on the bottom of hydrocarbon reacting compound layer 900. FIG. 25(*e*) illustrates three hydrocarbon reacting compound layers 900A–900C and two bentonite clay layers 901A–901B arranged in alternating layers.

It should be noted that such a sealing compound layer may either supplement or replace a liner layer by absorbing and/or sealing against leaching a hydrocarbon leak.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A leak detection and location system for an impoundment comprising:

a plurality of leak detection modules, said modules positioned below an impoundment and extending in a substantially continuous manner so that fluid escaping from a leak in the impoundment will be collected within at least one leak detection module positioned below the leak; and a plurality of fluid conduits, each of said plurality of fluid conduits being connected at a first end to one of said plurality of leak detection modules and accessible at a second end at an access passage;

wherein fluid which is collected within a leak detection module passes from the leak detection module through the respective fluid conduit connected thereto to said respective conduit second end; and wherein the location of each leak detection module is known in relation to the impoundment.

2. The leak detection and location system for an impoundment as claimed in claim 1, wherein said access passage is through an open trench.

3. The leak detection and location system for an impoundment as claimed in claim 1, wherein said access passage is through an embankment.

4. The leak detection and location system for an impoundment as claimed in claim 1, wherein said plurality of fluid conduits branch together under the impoundment and join at least one common conduit.

5. The leak detection and location system for an impoundment as claimed in claim 1, further comprising:
 a mobile sensor for detecting leaks which is dimensioned to fit within said fluid conduit and which can be maneuvered through a predetermined portion of said fluid conduit to ascertain the location of a leak.

6. A leak detection and location system for an impoundment comprising:
 a leak detection structure positioned below an impoundment, said leak detection structure having a plurality of leak localization zones, said leak detection structure including a drain assembly which traverses said leak localization zones;
 at least one fluid conduit connected at a first end to said leak detection structure drain assembly and accessible at a second end at an access location; and
 a mobile sensor for detecting leaks which is dimensioned to fit within said fluid conduit and which can be maneuvered through said fluid conduit and said leak detection structure drain assembly.

7. The leak detection and location system for an impoundment as claimed in claim 6, wherein said mobile sensor can be removed from said fluid conduit at an access location so that said mobile sensor can be serviced.

8. The leak detection and location system for an impoundment as claimed in claim 6, wherein said mobile sensor includes at least one of an optical sensor, a humidity sensor, a temperature sensor, an electric conductivity sensor, a pH sensor, a microphone, a calorimeter, and a pressure sensor.

9. The leak detection and location system for an impoundment as claimed in claim 6, where said mobile sensor includes at least one of an ultrasonic transmitter, an ultrasonic receiver, and an ultrasonic transceiver.

10. The leak detection and location system for an impoundment as claimed in claim 6, wherein said drain assembly in the leak detection structure includes branched perforated pipes spanning substantially all of the leak detection structure.

11. The leak detection and location system for an impoundment as claimed in claim 10, further comprising a filler of low permeability material located substantially between said branched perforated pipes to define said leak localization zones.

12. The leak detection and location system for an impoundment as claimed in claim 11, wherein said branched perforated pipes of the drain assembly form a herringbone pattern where substantially parallel perforated pipes branch from either side of a stem pipe and where said stem pipe connects to said fluid conduit.

13. The leak detection and location system for an impoundment as claimed in claim 6, wherein said drain assembly consists of a plurality of adjacent herringbone pipe layouts.

14. A leak detection system for an impoundment comprising:
 a plurality of leak detection structures positioned below an impoundment, each of said leak detection structures including a drain assembly therein, said plurality of leak detection structures being stacked one on top of each other;
 a substantially impermeable liner positioned between each of said stacked leak detection structures; and
 a plurality of fluid conduits, each of said plurality of fluid conduits connected at a first end to a drain assembly of a respective one of said leak detection structures and accessible at a second end at an access location.

15. The leak detection system for an impoundment as claimed in claim 14, further comprising:
 a device for detecting a fluid in any one of said fluid conduits so that fluid leaching through said impoundment will flow under the force of gravity and be collected in one of said plurality of drain assemblies, and further flow through said respective one of said fluid conduits to said access location and be detected.

16. The leak detection system for an impoundment as claimed in claim 15, further comprising:
 means for collecting said leaching fluid at each one of said plurality of conduit second ends.

17. A leak detection and location system for an impoundment comprising:
 a plurality of leak detection structures positioned below an impoundment, each of said leak detection structures including a drain assembly therein, said plurality of leak detection structures being stacked one on top of each other;
 a liner positioned between each of said stacked leak detection structures;
 at least one fluid conduit connected between said drain assembly of said leak detection structures and an access location; and
 a mobile sensor for detecting leaks which is dimensioned to fit within said fluid conduit and which can be maneuvered through a predetermined portion of said fluid conduit and said leak detection structure drain assemblies.

18. The leak detection and location system for an impoundment as claimed in claim 17, further comprising:
 a plurality of fluid conduits, each of said plurality of fluid conduits connected at a first end to a drain assembly of a respective one of said leak detection structures and accessible at a second end at an access location, and wherein said plurality of fluid conduits nest one inside the other for at least a portion of their respective lengths.

19. The leak detection and location system for an impoundment as claimed in claim 17, wherein each of said leak detection structures includes a plurality of leak localization zones and wherein each of said drain assemblies traverses the leak localization zones of a respective one of said leak detection structures.

20. The leak detection and location system for an impoundment as claimed in claim 19, further comprising:
 a filler of low permeability material;
 wherein said drain assembly in the leak detection structure includes branched perforated pipes spanning substantially all of the leak detection structure, and wherein said filler of low permeability material is located substantially between said branched perforated pipes to define said leak localization zones.

21. The leak detection and location system for an impoundment as claimed in claim 20, wherein said branched perforated pipes form a herringbone pattern where said perforated pipes branch out substantially parallel from either side of a stem pipe and where said stem pipe connects to said fluid conduit.

22. The leak detection and location system for an impoundment as claimed in claim 17, further comprising:

a plurality of fluid conduits;

wherein at least one of said plurality of leak detection structures includes a plurality of leak detection modules, said modules being connected together to form a grid to be positioned below an impoundment and extending in a substantially continuous manner so that fluid escaping from a leak in the impoundment, which would move downwardly due to gravitational force, will be collected and localized within one or more leak detection modules positioned below the leak; and wherein each of said plurality of fluid conduits is connected at a first end to one of said plurality of leak detection modules and is accessible at a second end at an access location.

23. A method of constructing a facility for use as an impoundment comprising the steps of:

establishing a coordinate system for identifying specific locations within the facility;

providing a plurality of leak detection modules, the coordinate location of each leak detection module in the facility being known;

connecting said plurality of modules together so that fluid escaping from a leak in an impoundment positioned above the leak detection modules will be collected within at least one leak detection module positioned below the impoundment; and installing a plurality of fluid conduits, each of said plurality of fluid conduits being connected at a first end to one of said plurality of leak detection modules and accessible at a second end at an access passage, each of said fluid conduits at second end having a known association with the respective one of said plurality of modules.

* * * * *